(12) United States Patent  
Yates

(10) Patent No.: US 8,316,394 B2  
(45) Date of Patent: Nov. 20, 2012

(54) INTERACTIVE MEDIA GUIDANCE APPLICATION WITH INTELLIGENT NAVIGATION AND DISPLAY FEATURES

(75) Inventor: Doug Yates, Los Angeles, CA (US)

(73) Assignee: United Video Properties, Inc., Los Angeles, CA (US)

( * ) Notice: Subject to any disclaimer, the term of this patent is extended or adjusted under 35 U.S.C. 154(b) by 0 days.

(21) Appl. No.: 12/634,869

(22) Filed: Dec. 10, 2009

(65) Prior Publication Data

US 2010/0153999 A1 Jun. 17, 2010

Related U.S. Application Data

(63) Continuation of application No. 11/388,866, filed on Mar. 24, 2006, now abandoned.

(51) Int. Cl.
*G06F 13/00* (2006.01)
*G06F 3/00* (2006.01)
*H04N 5/445* (2011.01)

(52) U.S. Cl. ................ 725/39; 725/41; 725/56

(58) Field of Classification Search ............ 725/37–39, 725/41, 44–46, 56
See application file for complete search history.

(56) References Cited

U.S. PATENT DOCUMENTS

| | | | |
|---|---|---|---|
| 5,544,354 A | 8/1996 | May et al. | |
| 5,583,560 A | 12/1996 | Florin et al. | |
| 5,815,145 A | 9/1998 | Matthews, III | |
| 5,900,868 A * | 5/1999 | Duhault et al. | 725/42 |
| 6,020,930 A * | 2/2000 | Legrand | 725/41 |
| 6,177,931 B1 | 1/2001 | Alexander et al. | |
| 6,295,646 B1 * | 9/2001 | Goldschmidt Iki et al. | 725/41 |
| 7,174,512 B2 * | 2/2007 | Martin et al. | 715/719 |
| 7,296,295 B2 * | 11/2007 | Kellerman et al. | 726/26 |
| 7,543,322 B1 * | 6/2009 | Bhogal et al. | 725/46 |
| 2002/0067376 A1 * | 6/2002 | Martin et al. | 345/810 |
| 2002/0166122 A1 * | 11/2002 | Kikinis et al. | 725/56 |
| 2003/0014752 A1 * | 1/2003 | Zaslavsky et al. | 725/40 |
| 2003/0131355 A1 * | 7/2003 | Berenson et al. | 725/46 |
| 2004/0001081 A1 * | 1/2004 | Marsh | 345/721 |
| 2004/0070593 A1 * | 4/2004 | Neely et al. | 345/716 |
| 2004/0117831 A1 * | 6/2004 | Ellis et al. | 725/53 |
| 2005/0283791 A1 * | 12/2005 | McCarthy et al. | 725/1 |
| 2007/0011702 A1 * | 1/2007 | Vaysman | 725/45 |
| 2010/0122294 A1 * | 5/2010 | Craner | 725/41 |

* cited by examiner

*Primary Examiner* — Pankaj Kumar
*Assistant Examiner* — Mulugeta Mengesha
(74) *Attorney, Agent, or Firm* — Ropes & Gray LLP

(57) ABSTRACT

Methods and systems are disclosed that allow a user to efficiently navigate media selections in an interactive media guidance application and easily identify media for viewing. The disclosed methods and systems provide an environment wherein video assets are displayed according to a user preference on a mosaic page with multiple cells. A subset of the assets appropriate for display in a particular cell is determined based on the user preference. Relevance scores of the assets meeting the user preference are computed, and the asset having the greatest relevance for the user is selected and displayed the corresponding cell. The relevance scores can be computed based on the user's historic viewing habits, user interaction with a media guidance application, or on specific user input.

44 Claims, 18 Drawing Sheets

INTERACTIVE MEDIA GUIDANCE APPLICATION WITH INTELLIGENT NAVIGATION AND DISPLAY FEATURES

BACKGROUND OF THE INVENTION

This invention relates to an interactive media guidance application that displays a mosaic page with selectable windows and/or cells personalized for a user or group of users, and more particular to an interactive media guidance application that displays video assets based on an expressed or historic interest of the user or group of users.

One exemplary interactive media guidance application is an interactive program guide (IPG) that allows television program information to be displayed on a user's television. Interactive program guides allow the user to navigate through television program information in the form of television program listings using a remote control.

Existing interactive program guides generally offer program guide data in a form of a menu with a program mix that is predetermined by the network operator. Program listings often show information regarding television programming in a neutral manner, such as textural information, that contain little, if any visual information, about the broadcaster and the contents of a program. Since the mix of programming options is fixed, it can in many cases not accommodate and/or remember customized settings for groups of users or individual users. A user typically is presented with a main menu and has to click through several options before arriving at a program habitually watched by the user.

Due to the ever increasing number of channels and services, such as Video-On-Demand (VOD), High-Definition Television (HDTV), Pay-per-View (PPV), Digital Video Recorder (DVR), music channels, etc., digital cable and digital satellite broadcast (DSB), subscribers are faced with an on-going challenge of simplifying and enhancing their TV viewing experience. In other forms of entertainment, for example, video and audio streamed over the Internet, TV users also lack the opportunity to personalize the vast array of television offerings and to present these offering in an informative and manageable form.

In many cases, a user tends to watch a limited number of favorite channels or is interested in certain genres or topics. Although detailed information about video assets available on other channels or from other sources is generally available, for example, supplied by the service provider with the interactive media guidance application, the user may be unaware of the information and may never access the asset.

It would therefore be desirable to provide systems and methods to present video assets to a user in a more user-friendly and interactive manner. It would also be desirable to provide systems and methods that can present a user with a personalized mosaic page based on the user's historic or expressed preferences, such as topics, names of shows, actors, sports teams, etc. It would furthermore be desirable to make the personalized mosaic page available to the user in a different format, from a different source and/or independent of the user equipment.

SUMMARY OF THE INVENTION

These and other objects of the invention are accomplished in accordance with the principles of the present invention by providing a personalized mosaic page with a plurality of cells arranged on the display that are fully customizable, allowing a user or a group of users to create their own personalized interactive mosaic page. The system can be programmed to intelligently fill in the appropriate cells of the mosaic with the most relevant content for a user or group of users based, for example, on the user's viewing habits or viewing history, or based on active user input.

The cells on the mosaic page may be partitions of a display screen and may be selectable. There may be any number of cells on a display screen. The cells may be any size and the cells may be of any shape and may be arranged in any order, definable by the user. Layout and size of the cells may be based on a template which may be user-selectable. Pages and cells may be arranged in a hierarchical structure wherein, for example, a cell on one page is linked to another page and/or to cells on other pages.

The cells or at least some of the cells may include a "smart feature." Smart features may also be associated with an entire mosaic page. The smart features are designed to allow the system to intelligently fill in the cells on the mosaic page with the most relevant content for a user. The system can learn the relevance of content from, for example, a user's historic viewing pattern and fill the cells automatically, or the user can enter or select from a list keywords, search strings or the like, which the system can then match with information residing on the system and/or provided by an interactive media guidance application. User-supplied terms can be suitable parsed and analyzed using, for example, fuzzy logic and/or neural networks. The results from the analysis and comparison may be organized in the order of their relevance for the user.

The system can also learn the relevance of content from user access to web-based content, such as online TV listings (such as TVGuide®, www.tvguide.com) or from mobile IPG applications accessed, for example, from a mobile phone. Stated differently, in a multi-platform environment, relevance of content for a user can be determined from any information about the user preferences to which the system has access.

According to one aspect of the invention, a method for displaying media assets of interest to a user includes the steps of arranging on a mosaic page a plurality of cells and, based on a historic or expressed user's preference, associating with a cell a subset of the media assets, for example, one or more of the media assets. The method further includes selecting from the associated assets for display in each cell the asset having a greatest relevance for the user, and filling each cell on the mosaic page with the asset having the greatest relevance.

According to another aspect of the invention, a system for displaying media assets of interest to a user includes a display which displays a mosaic page having a plurality of cells, and user equipment configured to associate with a cell a subset of the media assets based on a historic or expressed user's preference, to select from the associated assets for each cell the most relevant asset for the user, and to fill each cell on the mosaic page with the most relevant asset.

In one exemplary embodiment, the user preference can be associated with a media asset's genre and/or a broadcast channel or other program source supplying the asset. The relevance of the asset for the user can be associated with the user's viewing frequency of the asset, based on a comparison between the user preference and the programming data of an interactive media guidance application or data related to locally stored program content. Programming data can include a title, a show time, a media channel, and/or a synopsis of the identified content supplied by the interactive media guidance application. The media asset can be associated with a television channel, a television service provider, a video-on-demand (VOD) channel, a pay-per-view (PPV) channel, a recorded video (DVR) program, an interactive media guidance application, a web-site, a program guide service provider, a service, a digital music programmer, and/or a radio station.

The selected asset can be displayed as a preview of the media asset or as a live video. Additional information associated with the asset can be displayed on the mosaic page, for example, in a separate window, in a message bar, whereby the user can be alerted to events of relevance to the user.

The mosaic pages can be arranged hierarchically, with one page optionally a mosaic home page for a user or group of users, and the page layout can be selectable by a user, for example, from a template. The cells on the mosaic page can be associated with interactive features, which may provide the user with an opportunity to watch program content related to a relevant asset, to respond to merchandise offers, to record a program, and/or to access assets from other channels or sources, such as an interactive media guidance application.

In another exemplary embodiment, information about the mosaic page on a first user device may be made available on a second, different user device, for example, by sending the information over a network, such as a local area network or the Internet, or by storing and physically transporting the information from the first to the second device, for example, on a flash memory, a memory card, a recordable CD or a DVD. Other electronic devices, such as a suitable remote control, a personal digital assistant (PDA) and/or a cell phone may also be used for transporting the information.

Further features of the invention, its nature and various advantages will be more apparent from the accompanying drawings and the following detailed description of the preferred embodiments.

DETAILED DESCRIPTION OF PREFERRED EMBODIMENTS

Figure 1:
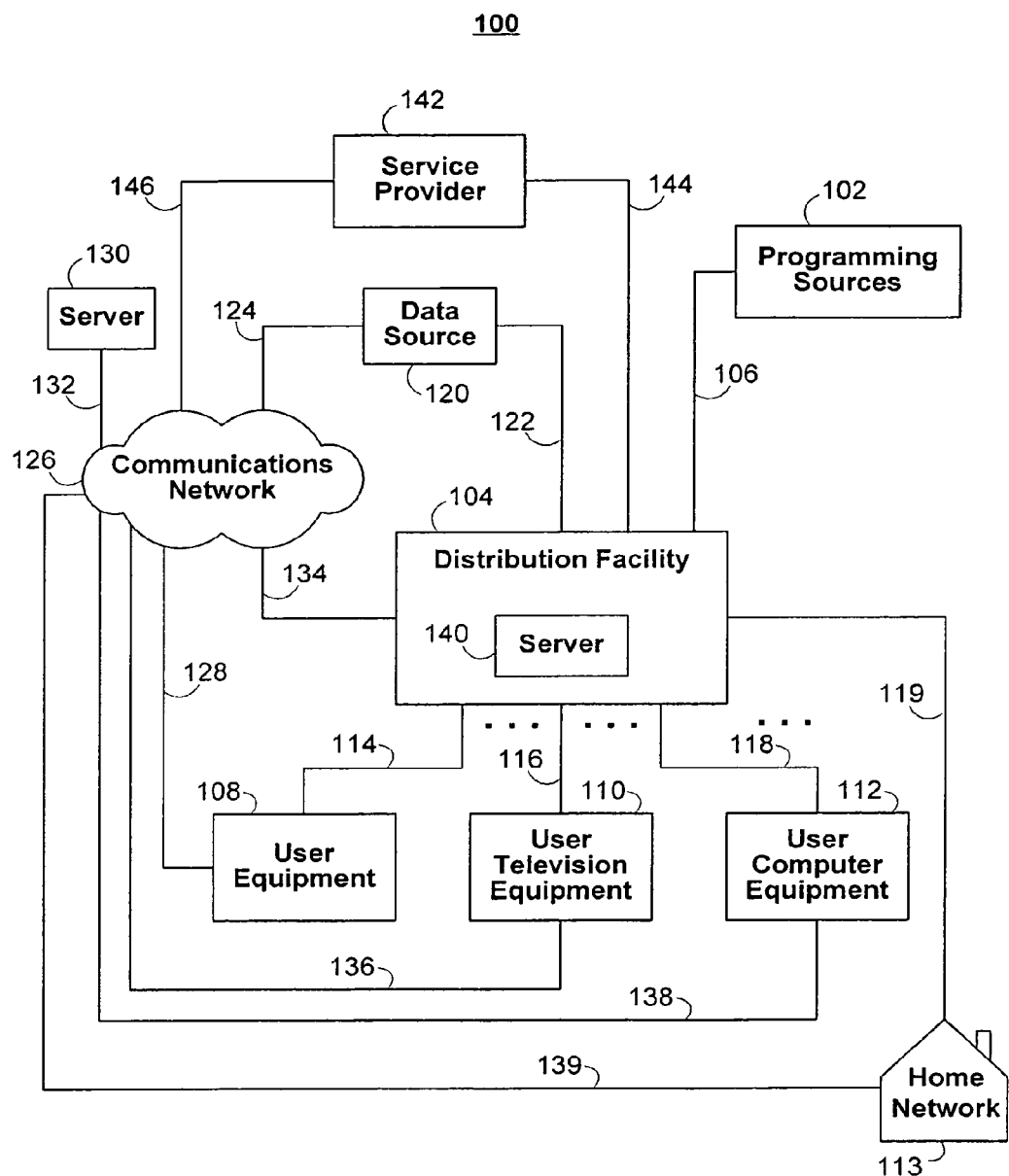
FIG. 1 shows an illustrative interactive media guidance system in accordance with the present invention.

The amount of media assets available to users in any given media delivery system can be substantial. Consequently, many users desire a form of media guidance, i.e., an interface, that allows users to efficiently navigate media selections and easily identify media that they may desire. An application which provides such guidance is referred to herein as an interactive media guidance application or, sometimes, an interactive program guide.

Interactive media guidance applications may take various forms depending on the media for which they provide guidance. One typical type of media guidance application is an interactive program guide (IPG). Interactive program guides are well-known guidance applications that, among other things, allow users to navigate among and locate television programming viewing choices and, in some systems, digital music. The television programming (and music programming) may be provided via traditional broadcast, cable, or satellite. The programming may be provided on a subscription basis (sometimes referred to as premium programming), as pay-per-view (PPV) programs, or on-demand such as in video-on-demand (VOD) systems.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on hand-held computers, personal digital assistants (PDAs) or cellular telephones. In some systems, users may control equipment remotely via a media guidance application. For example, users may access an online media guide and set recordings or other settings on their in home equipment. This may be accomplished by the on-line guide controlling the user equipment directly or via another media guide that runs on the user equipment.

In one suitable embodiment of the present invention, a personalized mosaic page with a plurality of suitably arranged cells can be launched when the TV display and/or tuner device are turned on. The cells on the mosaic page can be personalized with video assets from broadcast channels, video on demand (VOD), pay-per-view (PPV), advertising channels, recorded assets (DVR), locally stored assets, web-sites, and the like. The cells may be any suitable size and/or shape and may be located at any suitable location on the display screen. The location, shape and size of the cells may be defined by templates which can be selected by the user and stored locally on the user equipment. Cells may include text, still images, video images, symbols, logos, or a combination of these elements.

In one suitable approach, a message bar or news ticker may be displayed on the mosaic page, for example, at the bottom of the screen, to provide personalized news, sports scores, updates and reminders of broadcasts, movies, shows, etc. The interactive program guide may display its own brand mark on each display screen.

In one suitable approach, one or more cells on a mosaic page may refer to another mosaic page. For example, a cell on a mosaic page, which may be a mosaic home page of a user, referring to sports may be linked to a page with cells that include only those sports, such as football or golf, which the user is interested in. Another cell may refer to a listing of programs from an interactive media guidance application.

The user may navigate on the mosaic page of the interactive application by, for example, using the keys on a remote control device in a manner known in the art. The cell to which the user navigates may become the cell "in focus." The interactive application may denote a cell as being in focus by, for example, highlighting that cell, by increasing the size of that cell, and by enabling the audio signal associated with that cell. Bandwidth limitations may only allow still images or logos to be displayed in most or all cells instead of live video images. However, any still image/logo displayed in a cell may be replaced with live video and audio when that cell is highlighted.

In one suitable embodiment, a web-site (e.g., in the form of a Universal Resource Locator (URL)) can be associated with a particular cell. If that cell is highlighted, the interactive television application may activate a web-browser and display a television channel associated with that cell.

The user may select the cell in focus by pressing navigational keys, such as the SELECT key or OK key on the remote control. Pressing the SELECT key or the OK key while a cell is in focus may perform an action related to that cell. For example, selecting a cell with a television channel associated with it may cause the interactive program guide to display the video of the currently broadcasting television program of the associated television channel in full screen. Selecting a cell that has a web-site associated with it may launch a web-browser that will automatically display the content of that web-site. In a similar manner, VOD channels and DVR programs may be accessed and activated.

A mosaic page and/or a cell on a mosaic page may include an intelligent or "smart" feature which may be programmed to select from the available assets those assets that reflect a user's preference, based on for example, an expressed or habitual interest of the user. The smart feature can then arrange the selected assets and prompt the system to display on the mosaic page the most relevant asset for the user. The most relevant asset can be displayed when it becomes available, or user can be informed, for example, by a message in or near a cell or on a message bar of the date/time when the relevant asset will be available. The user can then, for example, instruct the system to record the asset. The smart feature enriches the user's experience with the interactive media guidance application.

An illustrative interactive media guidance system 100 in accordance with the present invention is shown in FIG. 1. System 100 is intended to illustrate a number of approaches by which media of various types, and guidance for such media, may be provided to (and accessed by) end-users. The present invention, however, may be applied in systems employing any one or a subset of these approaches, or in systems employing other approaches for delivering media and providing media guidance.

The first approach represents a typical television-centric system in which users may access television (and in some systems music) programming. This includes programming sources 102 and distribution facility 104. Media such as television programming and digital music is provided from programming sources 102 to distribution facility 104, using communications path 106. Communications path 106 may be a satellite path, a fiber-optic path, a cable path, or any other suitable wired or wireless communications path or combination of such paths.

Programming sources 102 may be any suitable sources of television and music programming, such as television broadcasters (e.g., NBC, ABC, and HBO) or other television or music production studios.

Programming sources 102 may provide television programming in a variety of formats in high definition and standard definition, such as, for example, 1080p, 1080i, 720p, 480p, 480i, and any other suitable format.

Distribution facility 104 may be a cable system headend, a satellite television distribution facility, a television broadcaster, or any other suitable facility for distributing video media (e.g., television programs, video-on-demand programs, pay-per-view programs) and audio media (e.g., music programming and music clips) to the equipment of subscribers of the corresponding cable, satellite, or IPTV system. In some approaches, distribution facility 104 may also distribute other media to users, such as video and audio clips, web pages, and interactive applications, that may be offered to subscribers of a given cable, satellite, or IPTV system. There are typically numerous distribution facilities 104 in system 100, but only one is shown in FIG. 1 to avoid overcomplicating the drawing.

Distribution facility 104 may be connected to various user equipment devices 108, 110, and 112. Such user equipment devices may be located, for example, in the homes of users. User equipment devices may include user equipment 110, user computer equipment 112, or any other type of user equipment suitable for accessing media. User equipment 108 may be any type of user equipment (e.g., user equipment, user computer equipment, cellular phones, handheld video players, gaming platforms, etc.) and, for simplicity, user equipment devices may be referred to generally as user equipment 108.

User equipment devices 108, 110, and 112 may receive media (such as television, music, web pages, etc.) and other data from distribution facility 104 over communications paths, such as communications paths 114, 116, and 118, respectively. User equipment devices 108, 110, 112 may also transmit signals to distribution facility 104 over paths 114, 116, and 118, respectively. Paths 114, 116, and 118 may be cables or other wired connections, free-space connections (e.g., for broadcast or other wireless signals), satellite links, or any other suitable link or combination of links.

A second approach illustrated in FIG. 1 by which media and media guidance are provided to end users is a non-television-centric approach. In this approach media such as video (which may include television programming), audio, images, web pages, or a suitable combination thereof, are provided to equipment of a plurality of users (e.g., user equipment 108, user equipment 110, and user computer equipment 112) by server 130 via communications network 126. This approach is non-television-centric because media (e.g., television programming) is provided by and delivered at least partially, and sometimes exclusively, via equipment that have not traditionally been primarily focused on the television viewing experience. Non-television-centric equipment is playing a larger role in the television viewing experience.

In some embodiments for this approach, communications network 126 is the Internet. Server 130 may provide for example, a web site that is accessible to the user equipment and provides an on-line guidance application for the user. In such approaches, the user equipment may be, for example, a PC or a hand-held device such as a PDA or web-enabled cellular telephone that incorporates a web browser. In other embodiments, server 130 uses the Internet as a transmission medium but does not use the Web. In such approaches, the user equipment may run a client application that enables the user to access media. In still other approaches, communications network 126 is a private communications network, such as a cellular phone network, that does not include the Internet.

In yet other approaches, communications network 126 includes a private communications network and the Internet. For example, a cellular telephone or other mobile-device service provider may provide Internet access to its subscribers via a private communications network, or may provide media such as video clips or television programs to its subscribers via the Internet and its own network.

The aforementioned approaches for providing media may, in some embodiments, be combined. For example, a distribution facility 104 may provide a television-centric media delivery system, while also providing user equipment (e.g., 108, 110 and 112) with access to other non-television-centric delivery systems provided by server 130. For example, a user equipment may include a web-enabled set-top box or a television enabled PC. Distribution facility 104 may, in addition to television and music programming, provide the user with Internet access whereby the user may access server 130 via communications network 126. Distribution facility 104 may communicate with communications network 126 over any suitable path 134, such as a wired path, a cable path, fiber-optic path, satellite path, or combination of such paths.

Media guidance applications may be provided using any approach suitable for the type of media and distribution system for which the applications are used. Media guidance applications may be, for example, stand alone applications implemented on user equipment. In other embodiments, media guidance applications may be client-server applications where only the client resides on the user equipment. In still other embodiments, guidance applications may be provided as web sites accessed by a browser implemented on the user equipment. Whatever the chosen implementation, the guidance application will require information about the media for which it is providing guidance. For example, titles or names of media, brief descriptions, or other information may be necessary to allow users to navigate among and find desired media selections.

In some embodiments, for example, the guidance application may be a stand-alone interactive program guide that receives program guide data via a data feed (e.g., a continuous feed, trickle feed, or data in the vertical blanking interval of a channel). Data source 120 in system 100 may include a program listings database that is used to provide the user with television program-related information such as scheduled broadcast times, titles, channels, ratings information (e.g., parental ratings and critic's ratings), detailed title descriptions, genre or category information (e.g., sports, news, movies, etc.), program format (e.g., standard definition, high definition) and information on actors and actresses. Data source 120 may also be used to provide advertisements (e.g., program guide advertisements and advertisements for other interactive television applications), real-time data such as sports scores, stock quotes, news data, and weather data, application data for one or more media guidance applications or other interactive applications, and any other suitable data for use by system 100. As another example, data source 120 may provide data indicating the types of information that may be included in interactive media guidance overlays (e.g., at the request of the user, absent user modification, etc.).

Program guide data may be provided to user equipment, including user equipment located on home network 113, using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

In some television-centric embodiments, guidance data from data source 120 may be provided to user equipment using a client-server approach. For example, a guidance application client residing on the user equipment may initiate sessions with server 140 to obtain guidance data when needed. In some embodiments, the guidance application may initiate sessions with server 140 via a home network server (e.g., a server located in home network 113 that supports the user equipment devices located in home network 113).

There may be multiple data sources (such as data source 120) in system 100, although only one data source is shown in FIG. 1 to avoid overcomplicating the drawing. For example, a separate data source may be associated with each of a plurality of television broadcasters and may provide data that is specific to those broadcasters (e.g., advertisements for future programming of the broadcasters, logo data for displaying broadcasters' logos in program guide display screens, etc.). Data source 120 and any other system components of FIG. 1 may be provided using equipment at one or more locations. Systems components are drawn as single boxes in FIG. 1 to avoid overcomplicating the drawings.

Data source 120 may provide data to distribution facility 104 over communications path 122 for distribution to the associated user equipment and home network 113 (discussed below) over paths 114, 116, 118, and 119 (e.g., when data source 120 is located at a main facility). Communications path 122 may be any suitable communications path such as a satellite communications path or other wireless path, a fiber-optic or other wired communications path, a path that supports Internet communications, or other suitable path or combination of such paths.

In some television-centric and non-television centric approaches, data source 120 may provide guidance data directly to user equipment 108 over path 124, communications network 126, and path 128 (e.g., when data source 120 is located at a facility such as one of programming sources 102). In some embodiments of the present invention, data source 120 may provide guidance data directly to user equipment located on home network 113 (discussed below) over path 124, communications network 126, and path 139 (e.g., when data source 120 is located at a facility such as one of programming sources 102). Paths 124, 128, and 139 may be wired paths such as telephone lines, cable paths, fiber-optic paths, satellite paths, wireless paths, any other suitable paths or a combination of such paths. Communications network 126 may be any suitable communications network, such as the Internet, the public switched telephone network, or a packet-based network.

User equipment devices, including user equipment devices located on home network 113 (discussed below), such as user equipment and personal computers, may use the program schedule data and other interactive media guidance application data to display program listings and other information (e.g., information on digital music) for the user. An interactive program guide application or other suitable interactive media guidance application may be used to display the information on the user's display (e.g., in one or more overlays that are displayed on top of video for a given television channel). Interactive displays may be generated and displayed for the user using any suitable approach. In one suitable approach, distribution facility 104, server 130, or another facility, may generate application display screens and may transmit the display screens to user equipment for display. In another suitable approach, user equipment may store data for use in one or more interactive displays (e.g., program schedule data, advertisements, logos, etc.), and an interactive media guidance application implemented at least partially on the user equipment may generate the interactive displays based on instructions received from distribution facility 104, server 130 or another facility. In some embodiments of the present invention, user equipment may store only the data that is used to generate the interactive television displays (e.g., storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays for the user.

In still other embodiments, interactive media guidance applications (television-centric and non-television centric) may be provided online as, for example, websites. For example, server 130 may provide an online interactive program guide. As another example, user equipment 108 may be a mobile device, such as a cellular telephone or personal digital assistant (PDA). The mobile device may be web-enabled to allow the user to access an on-line guidance application (which may be modified from its original version to make it appropriate for a cellular phone). Alternatively, the mobile device may have an applet that communicates with server 130 to obtain guidance data via the Internet.

Server 130 may receive program schedule data and other data from data source 120 via communications path 124, communications network 126, and communications path 132 or via another suitable path or combination of paths. Path 132 may be a satellite path, fiber-optic path, wired path, or any other path or combination of paths. User equipment 108 may access the on-line interactive media guidance application and other sources from server 130 via communications path 128. User equipment 108 may also access the application and other services on server 130 via communications path 114, distribution facility 104, and communications path 134. For example, a cable modem or other suitable equipment may be used by user equipment 108 to communicate with distribution facility 104.

User equipment such as user equipment 110, user computer equipment 112, and user equipment located on home network 113 may access the on-line interactive media guidance application and server 130 using similar arrangements. User equipment 110 may access the on-line interactive media guidance application and server 130 using communications path 136 or using path 116, distribution facility 104, and path 134. User computer equipment 112 may access the on-line interactive media guidance application and server 130 using communications path 138 or using path 118, distribution facility 104, and path 134. User equipment located on home network 113 may access the on-line media guidance application and server 130 using communications path 139 or using path 119, distribution facility 104, and path 134. Paths 136, 138, and 139 may be any suitable paths such as wired paths, cable paths, fiber-optic paths, wireless paths, satellite paths, or a combination of such paths.

In some embodiments, system 100 may support other interactive applications in addition to the interactive media guidance applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 140 at distribution facility 104, server 130, or other suitable equipment acts as the server). Other distributed architectures may also be used if desired. Moreover, some or all of the features of the interactive applications of system 100 (including the media guidance application) may be provided using operating system software or middleware software. Such operating system software and middleware may be used instead of or in combination with application-level software. In yet other approaches, interactive applications may also be supported by servers or other suitable equipment at one or more service providers such as service provider 142. Regardless of the particular arrangement used, the software that supports these features may be referred to as an application or applications.

For example, an interactive application such as a home shopping service may be supported by a service provider such as service provider 142 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 142 via distribution facility 104 and communications path 144 or via communications network 126 and communications path 146. Communications paths such as paths 144 and 146 may be any suitable paths such as wired paths, cable paths, fiber-optic paths, satellite paths, or a combination of such paths.

Another example of an interactive application is a home banking application. A home banking service may be supported using personnel at facilities such as service provider 142. An interactive home banking application that is implemented using the user equipment may access the home banking service via distribution facility 104 and communications path 144 or via communications network 126 and communications path 146.

If desired, an interactive media guidance application such as a network-based video recorder or a video-on-demand application may be supported using server 140, server 130, a home network server, or equipment at service provider 142. Video-on-demand content and video recorded using a network-based video recorder arrangement may be stored on server 140 or server 130 or a home network server or at service provider 142 and may be provided to the user equipment when requested by users. An interactive program guide, for example, may be used to support the functions of a digital video recorder (sometimes called a digital video recorder) that is implemented using user equipment 108. Illustrative equipment that may be used to support digital video recorder functions include specialized digital video recorder devices, integrated receiver decoders (IRDs), set-top boxes with integrated or external hard drives, or personal computers with video recording capabilities.

Interactive applications such as media guidance applications (e.g., interactive program guide applications and video-on-demand applications), home shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, digital video recorder functions, navigational functions, program guide functions, communications functions, and other suitable functions may be provided using one application or any other suitable number of applications. The one or more applications may display various overlays on user equipment including, for example, interactive television information on top of video for a given television channel.

Interactive program guide applications, home banking applications, home shopping applications, network-based video recorder and digital video recorder applications, video-on-demand applications, gaming applications, communications applications, and navigational applications are only a few illustrative examples of the types of interactive media guidance and other applications that may be supported by system 100. Other suitable interactive applications that may be supported include news services, web browsing and other Internet services, and interactive wagering services (e.g., for wagering on horse races, sporting events, and the like). Interactive television overlays that are displayed by these applications may also be customized in accordance with the present invention.

Users may have multiple types of user equipment by which they access media and obtain media guidance. For example, some users may have home networks that are accessed by in-home and mobile devices. As shown in FIG. 1, home network 113 communicates with distribution facility 104 and server 130 over paths 119 and 139 (and, in the case of server 130, communications network 126). Such home networks 113 may be located, for example, in homes of users or distributed, for example, among homes of users. Home networks 113 may each include a plurality of interconnected user equipment devices, such as, for example user equipment devices 108, 110 and 112. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the on-line guidance application to control the user's in-home equipment. The on-line guide may control the user equipment directly, or by communicating with a media guidance application on the user's in-home equipment.

Figure 2:
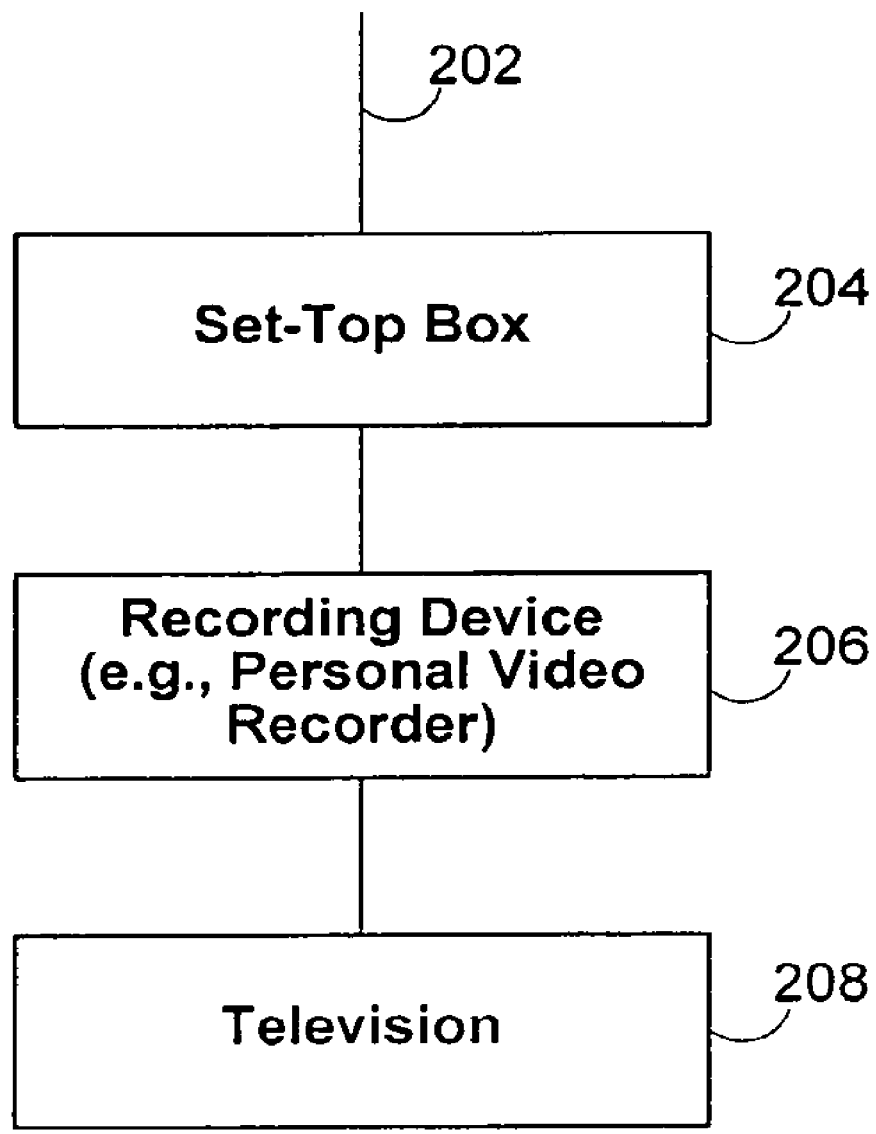
FIG. 2 shows illustrative user equipment based on a set-top box arrangement.

FIGS. 2-6 show illustrative arrangements for user equipment. An illustrative set-top box-based arrangement for user equipment 110 is shown in FIG. 2. User equipment 110 may be stand-alone or a part of home network 113 (FIG. 1). Input/output 202 may be connected to communications paths such as paths 116 and 136 (FIG. 1). Input/output functions may be provided by one or more wires or communications paths, but are shown as a single path in FIG. 2 to avoid overcomplicating the drawing. Television programming, program guide data, and any other suitable interactive media guidance application data or other data may be received using input/output 202. Commands and requests and other data generated as a result of user interactions with the interactive media guidance application may also be transmitted over input/output 202.

Set-top box 204 may be any suitable analog or digital set-top box (e.g., a cable set-top box). Set-top box 204 may contain an analog tuner for tuning to a desired analog television channel (e.g., a channel comprising television programming, interactive television data, or both). Set-top box 204 may also contain digital decoding circuitry for receiving digital television channels (e.g., channels comprising television or music programming, interactive television data, etc.). Set-top box 204 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 204 may be an integrated receiver decoder (IRD) that handles satellite television. If desired, box 204 may have circuitry for handling cable, over-the-air broadcast, and satellite content.

Set-top box 204 may be configured to output media, such as television programs, in a preferred format. Because television programs may be received in a variety of formats, set-top box 204 may contain scaler circuitry for upconverting and downconverting television programs into the preferred output format used by set-top box 204. For example, set-top box 204 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 204 may include a storage device (e.g., a digital storage device such as a hard disk drive) for providing recording capabilities. Box 204 may also be connected to a recording device 206 such as a video cassette recorder, digital video recorder, optical disc recorder, or other device or devices with storage capabilities. In some embodiments, box 204 may be configured to record either standard-definition television programs or high-definition television programs. In some embodiments, box 204 may be configured to record both standard-definition television programs and high-definition television programs.

Set-top box 204 contains a processor (e.g., a microcontroller or microprocessor or the like) that is used to execute software applications. Set-top box 204 may contain memory such as random-access memory for use when executing applications. Nonvolatile memory may also be used (e.g., to launch a boot-up routine and other instructions). Hard disk storage in box 204 or in recording device 206 may be used to back up data and to otherwise support larger databases and storage requirements than may be supported using random-access memory approaches. Hard disk storage in box 204 or in recording device 206 may also be used to store and back up program guide settings or saved user's preferences.

Set-top box 204 may have infrared (IR) or other communications circuitry for communicating with a remote control or wireless keyboard. Set-top box 204 may also have dedicated buttons and a front-panel display. The front-panel display may, for example, be used to display the current channel to which the set-top box is tuned.

Set-top box 204 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 204 may be integrated into other user equipment (e.g., a television or video recorder).

Recording device 206 may be used to record videos provided by set-top box 204. For example, if set-top box 204 is tuned to a given television channel, the video signal for that television channel may be passed to recording device 206 for recording on a videocassette, compact disc, digital video disk, or internal hard drive or other storage device. In some embodiments, recording device 206 may be configured to record either standard-definition television programs or high-definition television programs. In some embodiments, recording device 206 may be configured to record both standard-definition television programs and high-definition television programs. Recording device 206 may have communications circuitry such as a cable modem, an ISDN modem, a DSL modem, or a telephone modem for communications with other equipment. Such communications may involve the Internet or any other suitable communications networks or paths. The components of recording device 206 may be integrated into other user equipment (e.g., a television, stereo equipment, etc.).

Recording device 206 may be controlled using a remote control or other suitable user interface. If desired, video recorder functions such as start, stop, record and other functions for device 206 may be controlled by set-top box 204. For example, set-top box 204 may control recording device 206 using infrared commands directed toward the remote control inputs of recording device 206 or set-top box 204 may control recording device 206 using other wired or wireless communications paths between box 204 and device 206.

The output of recording device 206 may be provided to television 208 for display to the user. In some embodiments, television 208 may be capable of displaying high-definition programming (i.e., HDTV-capable). If desired, multiple recording devices 206 or no recording device 206 may be used. If recording device 206 is not present or is not being actively used, the video signals from set-top box 204 may be provided directly to television 208. Any suitable television or monitor may be used to display the video. For example, if the video is in a high-definition format, an HDTV-capable television or monitor is required to display the video. In the equipment of FIG. 2 and the other equipment of system 100 (FIG. 1), the audio associated with various video items is typically distributed with those video items and is generally played back to the user as the videos are played. In some embodiments, the audio may be distributed to a receiver (not shown), which processes and outputs the audio via external speakers (not shown).

Figure 3:
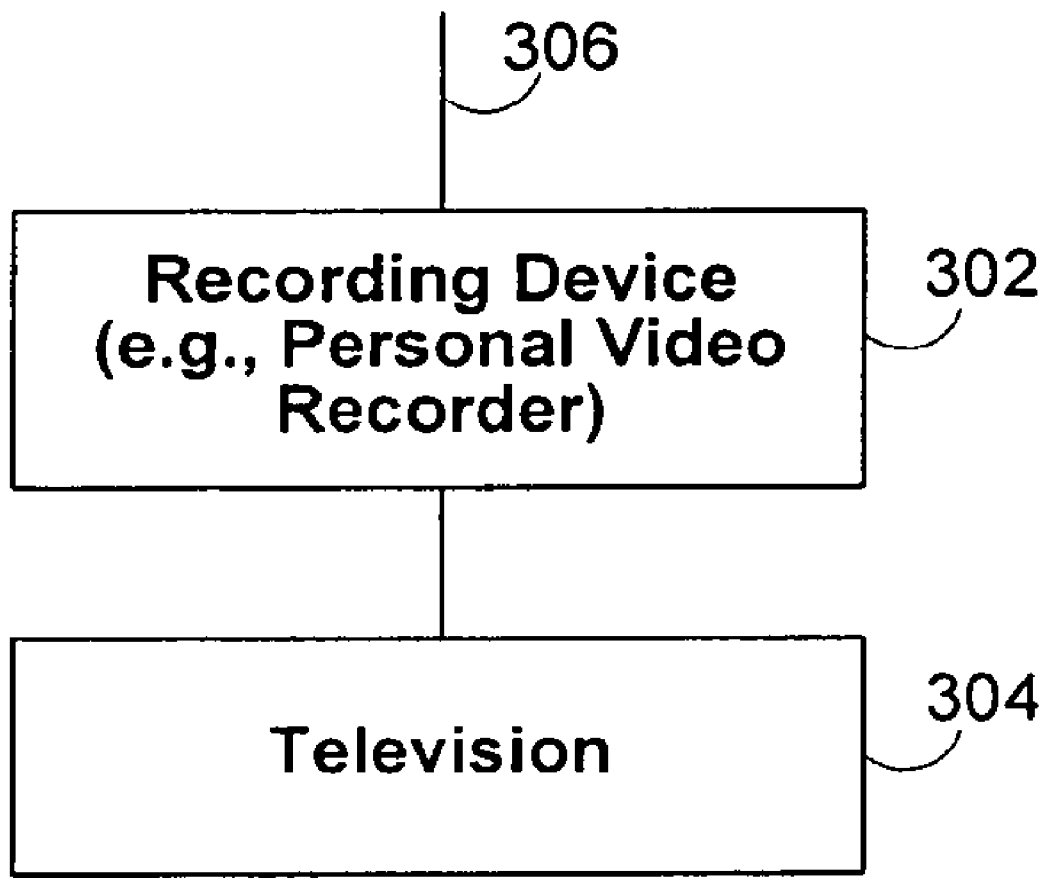
FIG. 3 shows another illustrative arrangement for user equipment.

Another illustrative arrangement for user equipment 110 (FIG. 1) is shown in FIG. 3. User equipment 110 may be stand-alone or a part of home network 113 (FIG. 1). In the example of FIG. 3, user equipment 110 includes a recording device 302 such as a digital video recorder (e.g., a digital video recorder (DVR)) that uses a hard disk or other storage for recording video. Recording device 302 may alternatively be a digital video disc recorder, compact disc recorder, videocassette recorder, or other suitable recording device. Equipment 110 of FIG. 3 may also include a television 304. In some embodiments, television 304 may be HDTV-capable. Input/output 306 may be connected to communications paths such as paths 116 and 136 (FIG. 1). Television programming, program schedule data, and other data (e.g., advertisement data, data indicating one or more television channels for which the display of an overlay is to be customized, etc.) may be received using input/output 306. Commands and requests and other data from the user may be transmitted over input/output 306.

Recording device 302 may contain at least one analog tuner for tuning to a desired analog television channel (e.g., to display video for a given television channel to a user, to receive program guide data and other data) and multiple other tuners may also be provided. Recording device 302 may also contain digital decoding circuitry for receiving digital television programming, music programming, program guide data, and other data on one or more digital channels. Recording device 302 may also contain circuitry for receiving high-definition television channels. If desired, recording device 302 may contain circuitry for handling analog, digital, and high-definition channels. Recording device 302 also contains a processor (e.g., a microcontroller or microprocessor or the like) that is used to execute software applications. Recording device 302 may contain memory such as random-access memory for use when executing applications. Nonvolatile memory may also be used to store a boot-up routine or other instructions. The hard disk and other storage in recording device 302 may be used to support databases (e.g., program guide databases or other interactive television application databases). The hard disk or other storage in recording device 302 may also be used to record video such as television programs or video-on-demand content or other content provided to recording device 302 over input/output 306.

Recording device 302 may have IR communications circuitry or other suitable communications circuitry for communicating with a remote control. Recording device 302 may also have dedicated buttons and a front-panel display. The front-panel display may, for example, be used to display the current channel to which the recording device is tuned.

Recording device 302 may also have communications circuitry such as a cable modem, an ISDN modem, a DSL modem, a telephone modem, or a wireless modem for communications with other equipment. Such communications may involve the Internet or other suitable communications networks or paths.

If desired, recording device 302 may include a satellite receiver or other equipment that has wireless communications circuitry for receiving satellite signals.

Recording device 302 of FIG. 3 or recording device 206 of FIG. 2 may record new video while previously recorded video is being played back on television 304 or 208. This allows users to press a pause button during normal television viewing. When the pause button is pressed, the current television program is stored on the hard disk of digital video recorder 302. When the user presses play, the recorded video may be played back. This arrangement allows the user to seamlessly pause and resume television viewing. Recording devices 302 and 206 may also be used to allow a user to watch a previously-recorded program while simultaneously recording a new program.

The set-top box arrangement of FIG. 2 and the digital video recorder with a built-in set-top box arrangement of FIG. 3 are merely illustrative. Other arrangements may be used if desired. For example, user equipment may be based on a WebTV box, a personal computer television (PC/TV), or any other suitable equipment arrangement. If desired, the functions of components such as set-top box 204, recording device 302, a WebTV box, or PC/TV or the like may be integrated into a television or personal computer or other suitable device.

Figure 4:
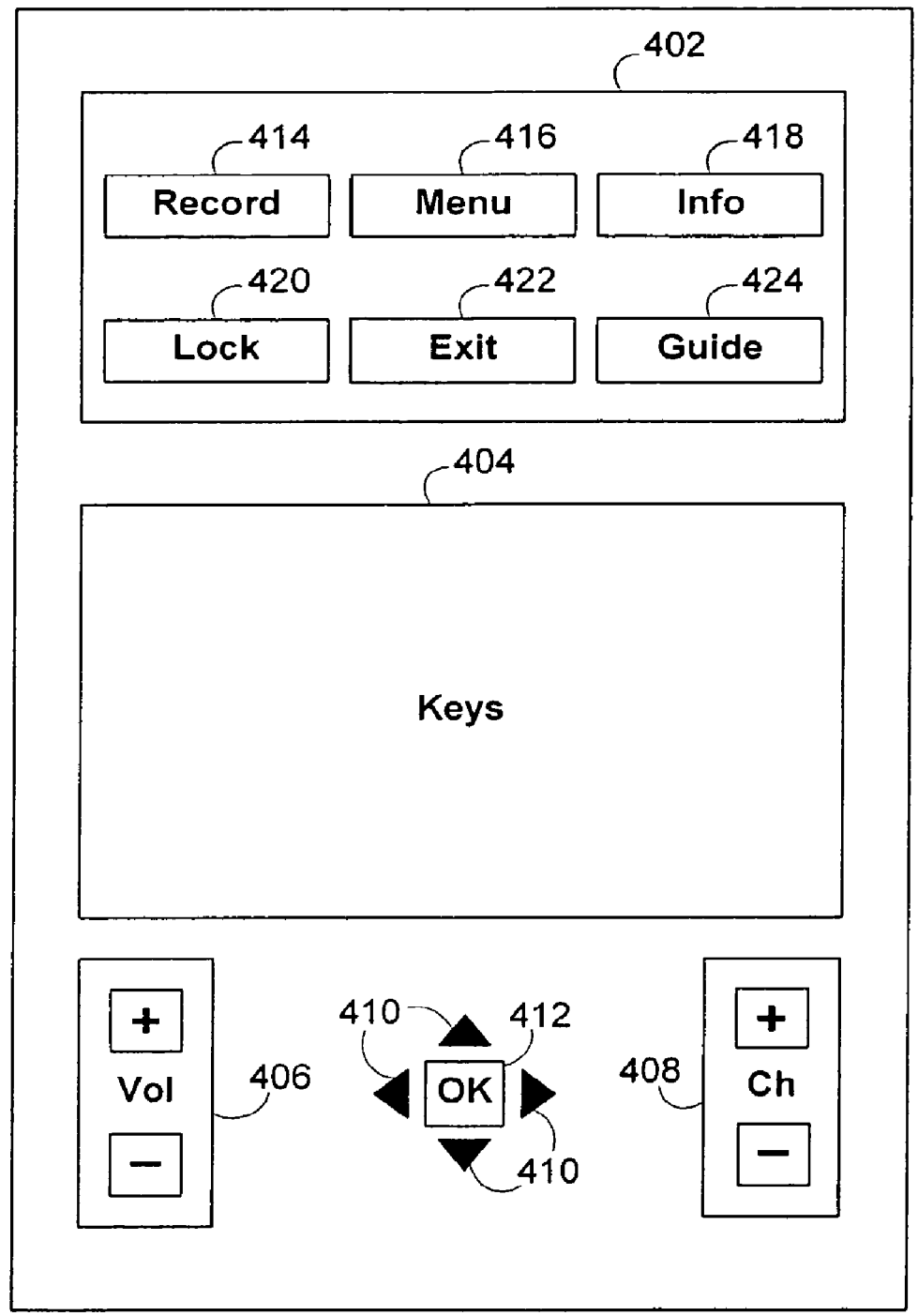
FIG. 4 shows an illustrative remote control for operating user television or computer equipment.

An illustrative remote control 400 for operating user equipment 110 (FIG. 1) or suitable user computer equipment 112 is shown in FIG. 4. Remote control 400 is only illustrative and any other suitable user input interface may be used to operate user equipment (e.g., a mouse, trackball, keypad, keyboard, touch screen, voice recognition system, etc.). Remote control 400 may have function keys 402 and other keys 404 such as keypad keys, power on/off keys, pause, stop, fast-forward and reverse keys. Volume up and down keys 406 may be used for adjusting the volume of the audio portion of a video. Channel up and down keys 408 may be used to change television channels and to access content on virtual channels. Cursor keys 410 may be used to navigate on-screen menus. For example, cursor keys 410 may be used to position an on-screen cursor, indicator, or highlight (sometimes all generically referred to herein as a highlight or highlight region) to indicate interest in a particular option or other item on a display screen that is displayed by the interactive television application.

OK button 412 (sometimes called a select or enter key) may be used to select on-screen options that the user has highlighted.

Buttons 402 may include RECORD button 414 for initiating recordings. MENU button 416 may be used to direct an interactive media guidance application to display a menu on the user's display screen (e.g., on television 208 or 304 or on a suitable monitor or computer display). INFO button 418 may be used to direct an interactive media guidance application to display an information display screen. For example, when a user presses INFO button 418 while video for a given television channel is displayed for the user, an interactive program guide may display a FLIP/BROWSE overlay including program schedule information for the current program on the given television channel on top of the video. As another example, when a particular program listing in an interactive television program listings display screen is highlighted, the user pressing INFO button 418 may cause an interactive program guide to provide additional program information associated with that program listing (e.g., a program description, actor information, schedule information, etc.).

LOCK button 420 may be used to modify access privileges. For example, a parent may use LOCK button 420 or on-screen options to establish parental control settings for the interactive media guidance application. The parental control settings may be time-based settings (e.g., to prevent a child from watching television during a particular time block, such as from 3:00 PM to 5:00 PM). The parental control settings may also be used to, for example, block programming based on rating, channel, and program title. A locked or blocked program (or other media) is typically not viewable until the interactive media guidance application is provided with a suitable personal identification number (PIN). Once this PIN has been entered, the interactive media guidance application will unlock the user equipment and allow the locked content to be accessed.

EXIT button 422 may be used to exit the interactive media guidance application or to exit a portion of the interactive media guidance application (e.g., to cause an interactive program guide to remove a FLIP, BROWSE, or other interactive television overlay from the display screen). GUIDE button 424 may be used to invoke an interactive program guide (e.g., a program guide menu screen, program listings screen, or other program guide screen).

The keys shown in FIG. 4 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 100 (FIG. 1). A help key may be used to invoke help functions such as context-sensitive on-screen help functions.

Figure 5:
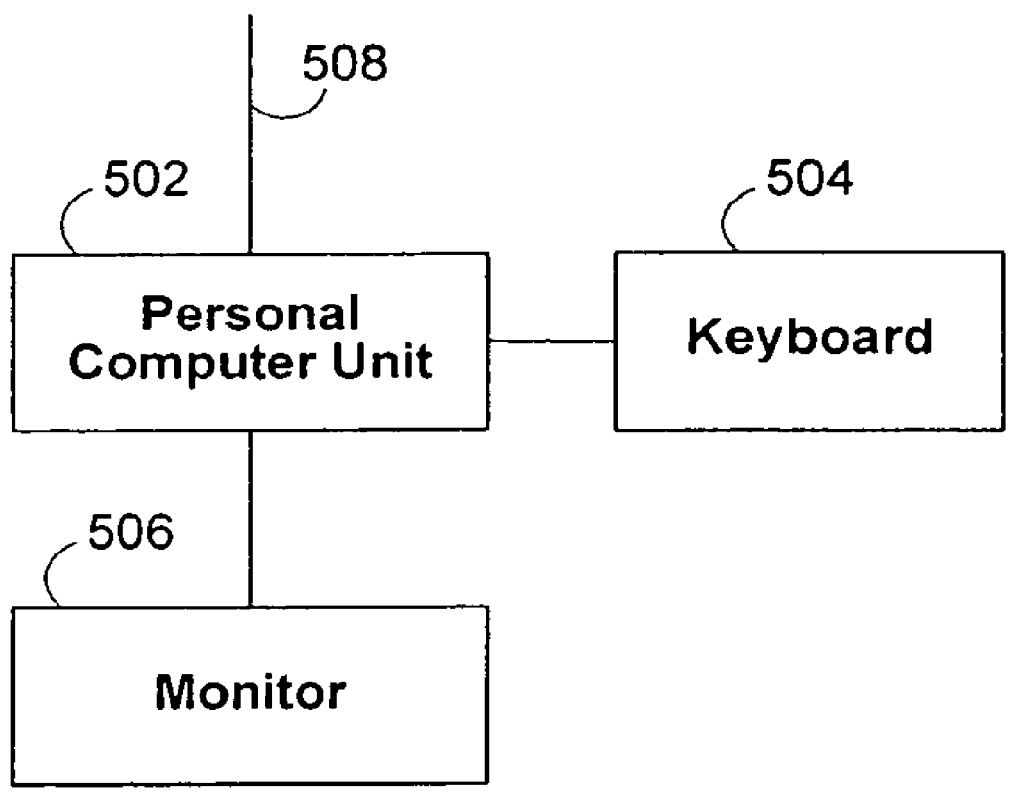
FIG. 5 shows illustrative user computer equipment.

Illustrative user computer equipment 112 (FIG. 1) is shown in FIG. 5. User computer equipment 112 may be stand-alone or a part of home network 113 (FIG. 1). In the arrangement of FIG. 5, personal computer unit 502 may be controlled by the user using keyboard 504 and/or other suitable user input device such as a trackball, mouse, touch pad, touch screen, voice recognition system, or a remote control, such as remote control 400 of FIG. 4. Video content, such as television programming or web pages having video elements, and interactive media guidance application display screens may be displayed on monitor 506. Television and music programming, media guidance application data (e.g., television program guide data), video-on-demand content, video recordings played back from a network-based video recorder, and other data may be received from paths 118 and 138 (FIG. 1) using input/output 508. User commands and other information generated as a result of user interactions with the interactive media guidance application and system 100 (FIG. 1) may also be transmitted over input/output 508.

Personal computer unit 502 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel. Any suitable card or components in computer unit 502 may be used to handle video and other content delivered via input/output line 508 if desired.

Personal computer unit 502 may contain one or more processors (e.g., microprocessors) that are used to run the interactive media guidance application or a portion of the interactive media guidance application.

Personal computer unit 502 may include a hard drive, a recordable DVD drive, a recordable CD drive, or other suitable storage device or devices that stores video, program guide data, and other content. The interactive media guidance application and personal computer unit 502 may use a storage device or devices to, for example, provide the functions of a digital video recorder.

User equipment, such as user equipment 108, user equipment 110, user computer equipment 112, and user equipment located on home network 113 (FIG. 1), may be used with network equipment such as server 130, server 140, a home network server, and equipment at service providers such as service provider 142 of FIG. 1 to provide network-based video recording functions. Video recording functions may be provided by storing copies of television programs and other video content on a remote server (e.g., server 130 or server 140 or a home network server) or other network-based equipment, such as equipment at a service provider such as service provider 142.

Video recordings may be made in response to user commands that are entered at user equipment 108 or user equipment located on home network 113 (FIG. 1). In a digital video recorder arrangement, the interactive media guidance application may be used to record video locally on the user equipment in response to the user commands. In a network-based video recorder arrangement, the interactive media guidance application may be used to record video or to make virtual recordings (described below) on network equipment such as server 130, server 140, a home network server, or equipment at service provider 142 in response to the user commands. The user commands may be provided to the network equipment over the communications paths shown in FIG. 1. The digital video recorder arrangement and the network-based video recorder arrangement can support functions such as fast-forward, rewind, pause, play, and record.

To avoid unnecessary duplication in a network-based video recorder environment, system 100 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 6:
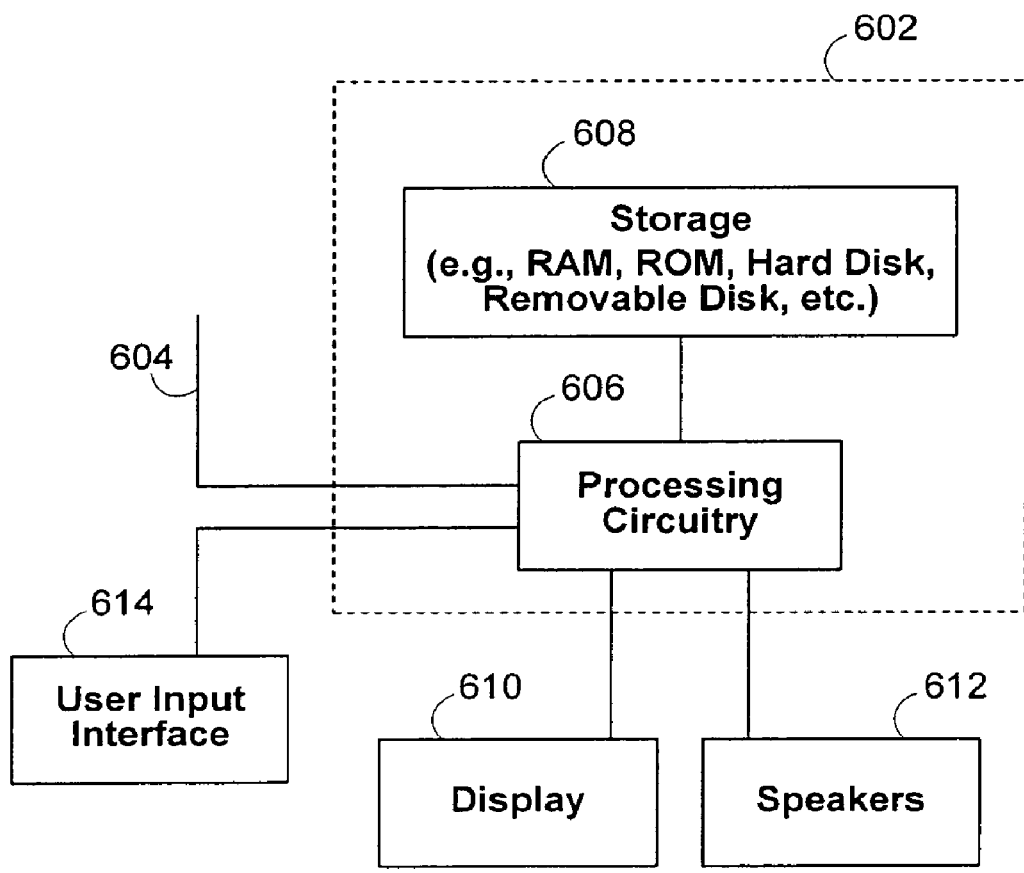
FIG. 6 shows illustrative user equipment located on a home network.

The user equipment and user computer equipment arrangements described above are merely illustrative. A more generalized embodiment of illustrative user equipment 108, 110, and 112 (FIG. 1) and user equipment located on home network 113 (FIG. 1) is shown in FIG. 6. Control circuitry 602 is connected to input/output 604. Input/output 604 may be connected to one or more communications paths such as paths 114, 116, 118, 128, 136, and 138 of FIG. 1. Media (e.g., television programming, music programming, other video and audio, and web pages) may be received via input/output 604 (e.g., from programming sources 102, servers or other equipment, such as server 130, service providers such as service provider 142, distribution facility 104, etc.). Interactive media guidance application data, such as program schedule information for an interactive program guide, may be received from data source 120 via input/output 604. Input/output 604 may also be used to receive data from data source 120 for other interactive television applications. The user may use control circuitry 602 to send and receive commands, requests, and other suitable data using input/output 604.

Control circuitry 602 may be based on any suitable processing circuitry 606 such as processing circuitry based on one or more microprocessors, microcontrollers, digital signal processors, programmable logic devices, etc. In some embodiments, control circuitry 602 executes instructions for an interactive media guidance application or other interactive application (e.g., web browser) from memory. Memory (e.g., random-access memory and read-only memory), hard drives, optical drives, or any other suitable memory or storage devices may be provided as storage 608 that is part of control circuitry 602. Tuning circuitry such as one or more analog tuners, one or more MPEG-2 decoders or other digital video circuitry, high-definition tuners, or any other suitable tuning or video circuits or combinations of such circuits may also be included as part of circuitry 602. Encoding circuitry (e.g., for converting over-the-air, analog, or digital signals to MPEG signals for storage) may also be provided. The tuning and encoding circuitry may be used by the user equipment to receive and display, play, or record a particular television or music channel or other desired audio and video content (e.g., video-on-demand content or requested network-based or local video recorder playback). Television programming and other video and on-screen options and information may be displayed on display 610. Display 610 may be a monitor, a television, or any other suitable equipment for displaying visual images. In some embodiments, display 610 may be HDTV-capable. Speakers 612 may be provided as part of a television or may be stand-alone units. Digital music and the audio component of videos displayed on display 610 may be played through speakers 612. In some embodiments, the audio may be distributed to a receiver (not shown), which processes and outputs the audio via speakers 612.

A user may control the control circuitry 602 using user input interface 614. User input interface 614 may be any suitable user interface, such as a mouse, trackball, keypad, keyboard, touch screen, touch pad, voice recognition interface, or a remote control.

Programs and interactive media guidance application data, such as program schedule information for an interactive program guide, may be displayed on a mosaic page, which can be a mosaic home page or another personalized mosaic page for one or more users. The mosaic page may be divided into cells displaying content linked to broadcast channels, VOD channels, music channels, PPV and VOD programs, and stored locally, for example, on recording devices 206, 302.

In one suitable embodiment of the present invention, a mosaic page may be displayed when user equipment 108, 110, 112 or any component in user equipment 108, 110, 112, such as set-top box 204 or recording device 206, 302, are switched on. The first-displayed mosaic page can be a mosaic home page.

Figure 7:
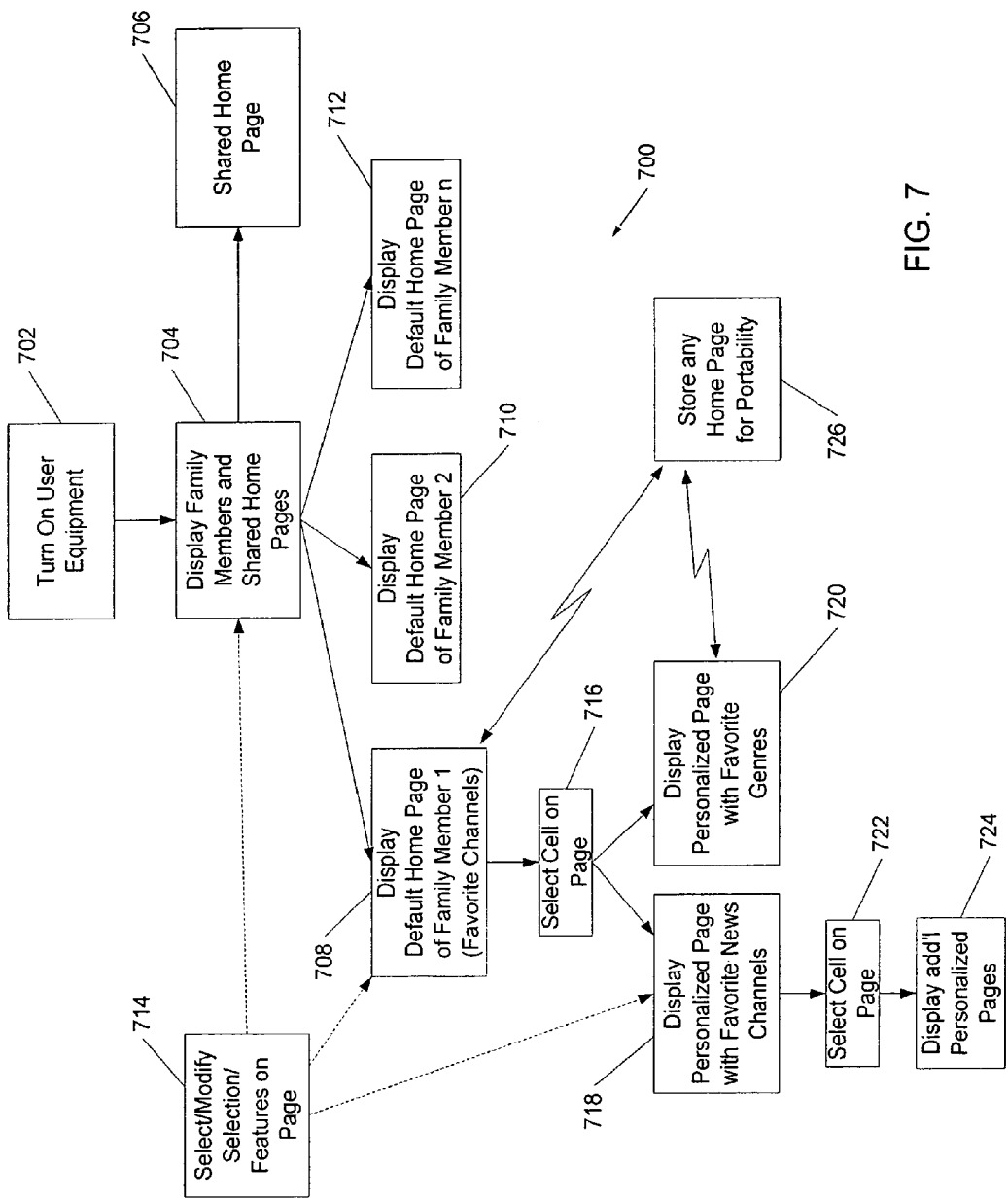
FIG. 7 is a schematic diagram of a process for selecting and displaying a mosaic page in accordance with the principles of one embodiment of the present invention.

FIG. 7 shows an illustrative flow chart diagram of an interactive media guidance application 700 for displaying mosaic pages for different users, which may allow a user to select additional mosaic pages with different, user-selectable personalized programming content. For example, when user equipment 108, 110, 112 is switched on, as indicated by box 702, a welcome screen 704 may be displayed, which lists, for example, family members 1 through n with access to mosaic pages 708, 710, 712 or to a shared mosaic page 706, where programs of common interest to at least some of family members 1 through n may be listed.

A mosaic (user-selected default or home) page for Family Member 1 may be displayed by selecting Family Member 1 with the OK button 412 on the remote control 400, as described before. The mosaic default home page may display any mix of programs and content sources, such as a live broadcast channel, contents stored on DVR, a video-on-demand (VOD) channel, a pay-per-view (PPV) channel, a television service provider, an interactive media guidance application, a web-site, a program guide service provider, a service, a digital music programmer, and/or a radio station. The number and type of selections may be personalized for a particular user and may depend, for example, on the number of available tuners in the set-top box 204 and/or on the desired program mix. Programs may also be selected and extracted from a composite digital video stream, such as an MPEG-2 stream, transmitting a plurality of channels. Different mosaic pages 710, 712 may be displayed for the other Family Members 2 through n.

The mosaic pages 706, 708, 710, 712 may display particular channels, i.e., single channel options, or may display cells that are linked to other personalized pages. For example, when the user, such as Family Member 1, selects a cell 716 on his/her mosaic default or home page displayed at step 708, a mosaic page 718 with particular live channels, such as news channels, or VOD and stored broadcast channels, or a mosaic page 720 with different genres (movies, shopping, sports, etc.) may be displayed. The user may then be able to again select a cell 722 from the mosaic page 718 to display an additional mosaic page 724. The present invention does not limit the number or the type of mosaic home pages or the number of other mosaic pages that can be created for a particular user or a group of users. It will be understood that the process described above for user or Family Member 1 can be repeated in a similar fashion for other users or groups of user. Such "personalized" mosaic pages can therefore also be set up for the shared mosaic home page 706.

A user or group of users can select and/or modify the cells and thereby the selection of features associated with a displayed mosaic page, as indicated by box 714. For example, keys 404 of remote control device 400 may include a DELETE key for deleting a particular selected cell, or a cell may be copied or moved by selecting the cells origin and destination and performing a function selected by one or more of the keys or buttons on remote control 400. The particular function assigned to a key or button of the remote control for a particular page may be displayed on the page. Keys or buttons can be statically or dynamically assigned. The terms key and button will be used interchangeably hereinafter.

As described in more detail below, the cells may include special interactive features providing additional functionality for displaying or interacting with content displayed in the cell. Such features may also be accessed with the remote control 400 (FIG. 4) or with another user input interface 614 (FIG. 6) and may or may not be copied and/or deleted when a cell is moved, copied or deleted.

It may be desirable to provide a user with the option to access the mosaic home page or another mosaic page from another location. To this end, the set-top box 204 or any other component of the user equipment may have a communication port to upload the mosaic page(s) or information necessary to create the mosaic page(s) a central location, such as distribution facility 104 (FIG. 1), to the other component via a network, such as home network 113 or communication network 106 (FIG. 1), and/or to a remote device 726, which may be a portable medium or the remote control 400 (FIG. 4). The remote device 726 may be connected to the user equipment 108, 110, 112 by a wireless connection, such as an infrared link, or by a wired connection. Other modes of communication between the remote device and the user equipment 108, 110, 112 for storing the mosaic pages, such as Bluetooth and USB, are also feasible. For example, the user may store a particular mosaic page on any removable storage medium, such as a memory stick, flash card, recordable CD or DVD. The other location may or may not have the same channel allocation, and may or may not be connected to the original location by home network 113. Sometimes, if the user travels to another location, that location may have a different channel allocation, and the association between broadcast channels and the video assets may have to be remapped, as described in more detail below.

Figure 8:
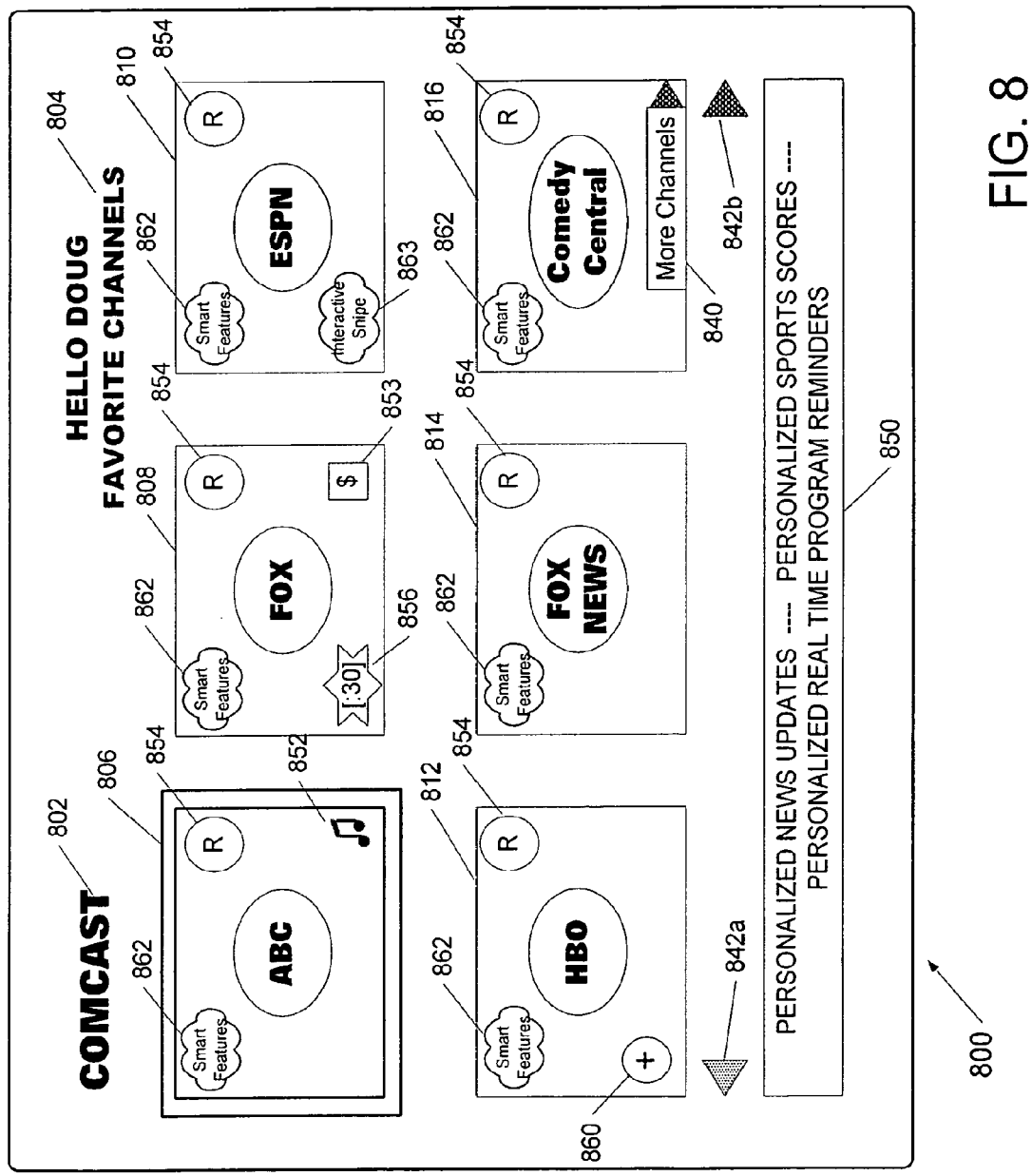
FIG. 8 shows a first exemplary menu screen in which a mosaic page for a particular user is displayed in accordance with the principles of the present invention.

Referring now to FIG. 8, a Family Member "DOUG" optionally selects his name from the Family Members' page 704, as described above with reference to FIG. 7, and is directed to his personalized (default) mosaic home page 800, which displays DOUG'S favorite channels together with a greeting 804. Page 800 as well as the personalized pages described below may display the logo 802 of the network or service provider. Page 800, as well as the pages described in the other pages below, may also be customized by a user-selectable skin or background. Other types of mosaic home pages may also be displayed, such as a home page 900 (FIG. 9) with favorites genres. In general, mosaic home pages 800, 900 may include various selectable television channels, radio stations, web-sites, VOD or stored (DVR) programs, or other suitable contents.

As shown in illustrative page 800, the display screen may be divided into any number of selectable partitions or a "mosaic" of cells 806, 808, 810, 812, 814, 816. Although six exemplary personalized cells are shown, the number of personalized cells can be varied depending on the user equipment and the network configuration, bandwidth, and channel allocation. The cells may be of any suitable size or shape, and need not necessarily have the same size or shape. The cells may be used to display any television asset that is currently being broadcast or is otherwise available, for example, on-demand, on a local harddrive, etc., as still images, text, logos, advertisements, or any other suitable video asset.

As mentioned above, the user can navigate between the cells by pressing the UP, DOWN, RIGHT, LEFT keys 410 and highlight a particular cell by pressing, for example, the OK button 412 on remote control 400. Any suitable means, such as a mouse, trackball, etc. connected, for example, to user interface 614 can be used to highlight the cell 806. On mosaic page 800, cell 806 is shown as being highlighted, as indicated by the double-line frame around the cell 806. A symbol 852 may be displayed in or near the highlighted cell to indicate that a live audio channel is now being played for that cell. Also displayed in the cell 806 may be a button 854 which can be activated, for example, by using arrow keys 410 on remote control 400 to move a cursor (not shown) to the corresponding screen position of button 854 within cell 806 and pressing the OK button 412 on remote control 400. Activation of the button 854 may prompt, for example, video recording device 206 (FIG. 2) to record the video broadcast currently showing in cell 806. However, depending on available tuners and tuner settings, programs in other cells that are not highlighted may also be recorded concurrently with the highlighted program or instead of the highlighted program.

Depending on the network settings, such as channel allocations and available transmission bandwidth, and on the user equipment 108, 110, 112, the cells 806, 808, 810, 812, 814, 816 may show still images, logos, text, or live video, or a mix thereof. Preferably, at least the selected or highlighted cell 806 shows live video and plays the corresponding live audio track. When another cell is selected by the user, for example, cell 810, that cell will be highlighted and live video with live audio will be displayed, together with an associated audio symbol 852. The previously highlighted cell 806 will then be un-highlighted, and its audio muted, i.e. the audio symbol 852 in cell 806 will disappear. However, the audio symbol 852 may also be moved to or activated in other cells that are not highlighted, in which case the live audio of that cell would be played. In another embodiment, a channel designation depicted on personalized page 800, such as ESPN, may be representative of several ESPN channels broadcasting different sports events, in which case the user upon selecting ESPN in cell 810 may be presented with another personalized page showing the various ESPN channels. Alternatively, the user may be presented with his/her "favorite" (ESPN) channel or with the "favorite" program from the various ESPN channels, as determined by the "smart" feature which is programmed to select from the user's preferred assets the asset having the greatest relevance for the user. Various modifications of the invention of implementing a smart feature and displaying the most relevant asset in a cell can be envisioned without departing from the scope of the invention.

According to another aspect of the invention, certain interactive features and options can be displayed in the cells 806, 808, 810, 812, 814, 816. As seen in FIG. 8, a "$" symbol 853 or the like may be displayed to indicate a promotion or merchandise offer associated with the current program. Clicking on the "$" symbol 853 with, for example, the OK button 412 on remote control 400 (or a cursor on a computer screen of user computer equipment 112) may allow the user to order merchandise online over, for example, a bidirectional cable or DSL connection or by phone. Other interactive features may include a program promotion, such as a movie trailer or a sneak preview, as illustrated by a [:30] symbol 856. Pressing the OK button 412 of remote control 400 on the [:30] symbol 856 may present to the user a 30 second preview of a video asset of potential interest to the user to entice the user to watch the full program.

Another interactive option may include bonus features, as indicated by the ⊕ symbol 860. One such bonus feature may include additional movie content, such as alternative endings, commentaries, etc., hitherto typically associated with movies distributed on physical media, such as DVDs. Clicking on the ⊕ symbol 860, or on any other symbol displayed in a cell, may open another window associated with the cell to display further options associated with the symbol. In one embodiment, clicking on the ⊕ symbol 860 may direct the user to a VOD selection where the same movie currently shown is also available on demand, allowing the user to watch the movie at another convenient time. In another embodiment, the user may be reminded that the movie had previously been recorded on recording device 206, 302 or on a server 130, 140 and is therefore available for viewing independent of the currently broadcast program.

As mentioned above, an "intelligent" or "smart" feature 862 can be associated with a mosaic page or a cell on a mosaic page. The smart feature 862 may be designed to monitor and/or track a user's historic or expressed viewing preferences and select, based on these preferences, an asset to be presented, such as displayed, to the user on the mosaic page according to an associated user relevance. The smart feature 862 may be user-programmable to include user-selected or user-defined preferences, such as favorite shows, movies, events, e.g., sports events with certain teams and/or players, actors, topics, and the like. For example, a user may be interested in a particular asset, such as a genre of movies or a particular NCAA basketball team. Information about that favorite program or event may be part of the title of the asset or event, but may also be included in other information associated with the asset or event, such as a brief synopsis of a movie supplied with the interactive media guidance application. In some embodiments, information about the user's historic or expressed preferences may be derived from the user's interactions with multiple pieces of user equipment 108. For example, users may access media and/or program guide data on various devices, such as their set-top box, mobile device (such as a cellular phone), and via an on-line guide (e.g., tvguide.co). The program guides (or other suitable clients) on those devices may exchange information about a user's preferences and the smart features on one or more of those devices may use such information to customize a mosaic display.

The smart feature will attempt to match the user's historic or expressed interest with the information about the asset or event and either display the asset in the corresponding cell automatically, when a match is found, or inform the user of a time or date when the asset will be available. For this purpose, the user equipment 108, 110, 112 or server 130, 140 may include a search functionality adapted to, for example, detect a relevance between the user preferences in the smart function and program data, for example, data from data source 120. Although the smart feature 862 is shown as associated with a particular cell or cells, smart features may also be placed on a mosaic page to encompass other or all cells on a mosaic page. Details of the smart feature 862, including the functionality for computing the relevance for a user and alerting a user, will be described in more detail below.

Mosaic page 800 in FIG. 8 may include a personalized message bar or news ticker 850 which may be personalized to show, for example, information about the most relevant assets, e.g., the most relevant news channels and sports scores, determined by the smart features for the mosaic page DOUG's Favorite Channels in FIG. 8. The personalized message bar or news ticker 850 may also display reminders to other relevant assets and events, such as shows, movies, specials, etc.

A cell, such as exemplary cell 810, may also include a Snipe button 863. Snipes are graphical "lures" (which may be animated) designed to entice a viewer to watch a show, order a show, purchase a product, or perform some other type of e-commerce. In response to the user selecting snipe 863, the interactive program guide provides the e-commerce opportunity to the user in a series of displays.

The mosaic page 800 may include other buttons that facilitate user navigation. For example, buttons 842a and 842b may allow the user to scroll to other sections of the mosaic page, for example, if a lesser number of cells are displayed on page 800 than are actually available. Buttons 842a and 842b may also be programmed to access the mosaic pages on the next higher or next lower level of the hierarchical page structure 700 of FIG. 7. Alternatively or in addition, one of the cells, for example cell 816, may be used to display listings of the interactive program guide and enable scrolling though broadcast programs while the remaining cells on page 800 remain undisturbed. In one embodiment, a button "More Channels" 840 may be activated in cell 816 to display specific, personalized broadcast channels or other channels of interest.

Figure 9A:
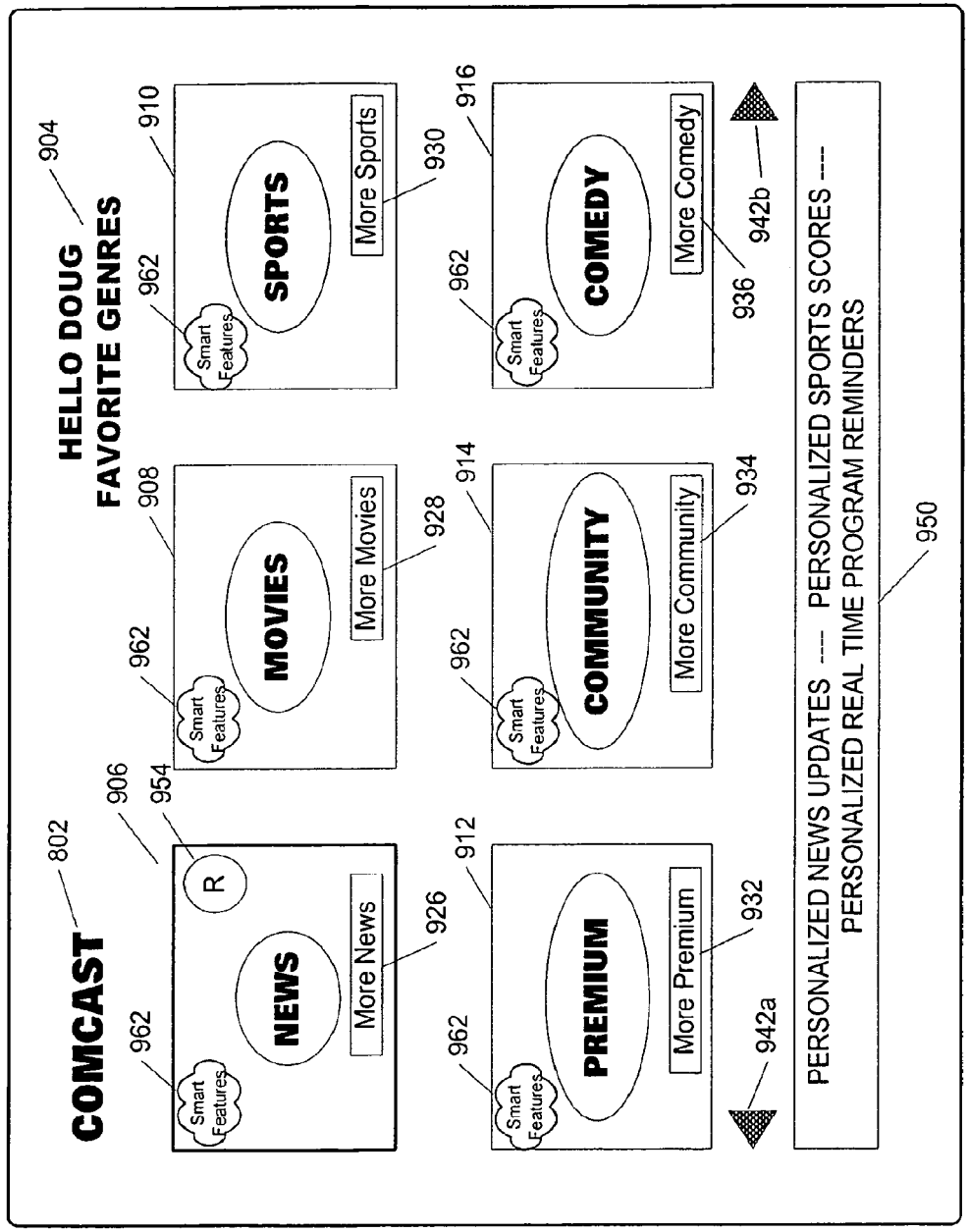
FIG. 9A shows a second exemplary menu screen in which a mosaic page showing favorite genres for a particular user is displayed in accordance with the principles of the present invention.

FIG. 9A illustrates another exemplary embodiment of a mosaic page 900 that can be provided in addition to or in lieu of mosaic page 800. Illustrative mosaic page 900 is shown as being organized by genres, such as news 906, movies 908, sports 910, premium channels 912, community channels 914, and other user-selected channels, such as comedy channels 916. The genre mosaic page 900 may also include a personalized greeting 904, a smart feature 962 and a record button (R) 954, which were described previously. It will be understood that any other suitable attribute described above with reference to FIG. 8, for example a personalized message bar or news ticker 950, may also be included.

Figure 9B:
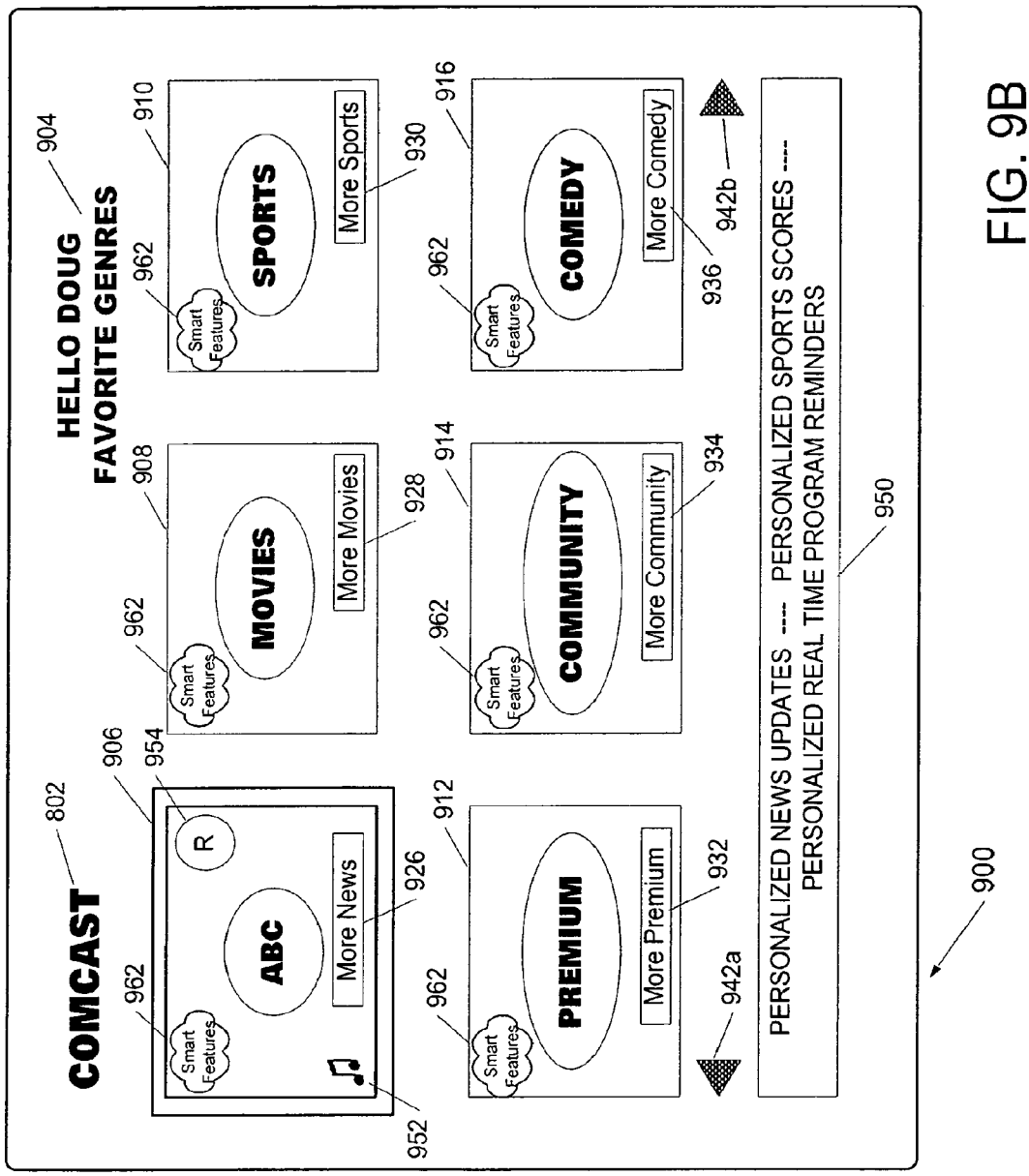
FIG. 9B shows the mosaic page of FIG. 9A with a favorite genre for a particular user highlighted.

On the exemplary page 900, cell 906 may, if not highlighted, for example display the genre "NEWS." An audio track may or may not be audible when the genre page is displayed. If an audio track is audible, it can be supplied by any available source or from a barker channel. If the user highlights exemplary cell 906, as indicated in FIG. 9B, it may display the favorite news channel "ABC" selected by the smart features according to, for example, a computed relevance score for the user. A live audio track 952 of the channel associated with that cell would then also be played. Alternatively, the most relevant asset for a cell could be displayed in that cell, regardless if the cell is highlighted or not. For example, a HBO asset or a listing of currently broadcast HBO assets could be displayed in cell 912. The user can record the corresponding asset, for example, in highlighted cell 906 by, for example, directing a cursor to the RECORD button 954 and pressing the OK button 412 on remote control 400. A cell displaying only a particular genre, such as sports in cell 910, may have a button 930 which may direct the user to another mosaic page with specific broadcast channels, VOD programs, recorded programs (DVR), available for viewing. The smart feature 962 described before may be included in any cell and/or on any page of the hierarchically arranged mosaic pages to display assets with the greatest relevance for the user. Buttons 942a and 942b may be provided to enable navigation to additional pages, channels or genres.

Figure 10:
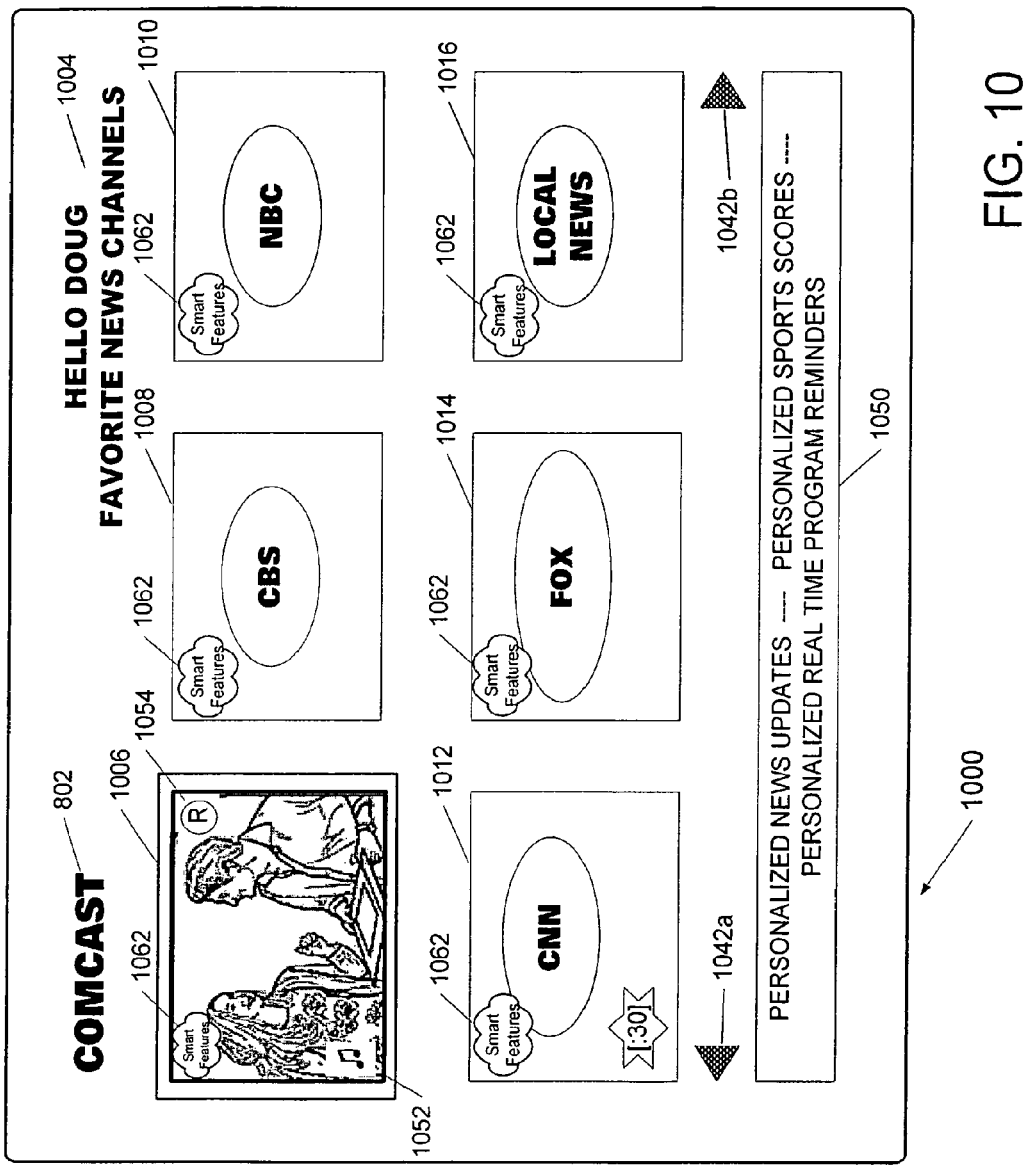
FIG. 10 shows an exemplary menu screen with a personalized page for a particular user accessible from another mosaic page of the user.

One exemplary embodiment of a mosaic page 1000 accessed by activating the button "More News" 926 on page 900 is illustrated in FIG. 10. Cell 1006 is selected as the active cell, with several features, such as live audio 1052 and one-touch recording 1054 of the news program enabled. As described above, the live audio track of a non-highlighted cell may also be played by moving the audio symbol to another channel, in which case the audio of the highlighted cell will be muted. Other features described with reference to pages 700 and 800, but not particularly shown, may be provided with any cell in any suitable combination. Buttons 1042a and 1042b may be provided to enable navigation to additional news channels.

Figure 11:
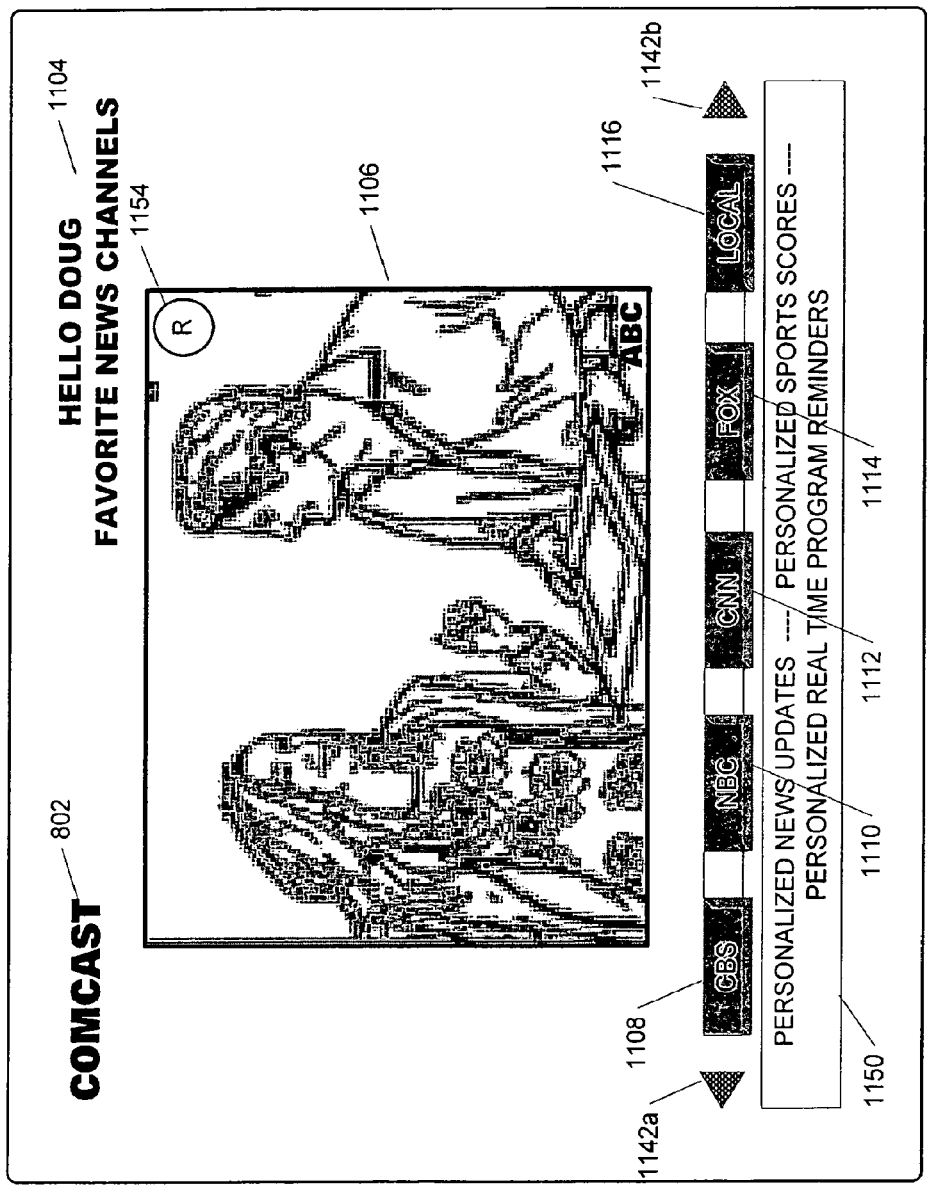
FIG. 11 shows another exemplary menu screen with a personalized page for another user accessible from a mosaic page.

Although the highlighted cell 1006 is shown as having the same size as the non-highlighted cells 1008, 1010, 1012, 1014, 1016, the size of the highlighted cell 1006 may be changed or the appearance of highlighted cell 1006 may be otherwise altered to feature more prominently on page 1000. For example, as shown in FIG. 11, cell 1006 of page 1000 (FIG. 10) may be resized as cell 1106, with the remaining news channel cells 1008, 1010, 1012, 1014, 1016 of page 1000 displayed on page 1100 as buttons 1108, 1110, 1112, 1114, 1116, respectively. In all other aspects, the features on page 1100 can be similar to those of page 1000.

Figure 12:
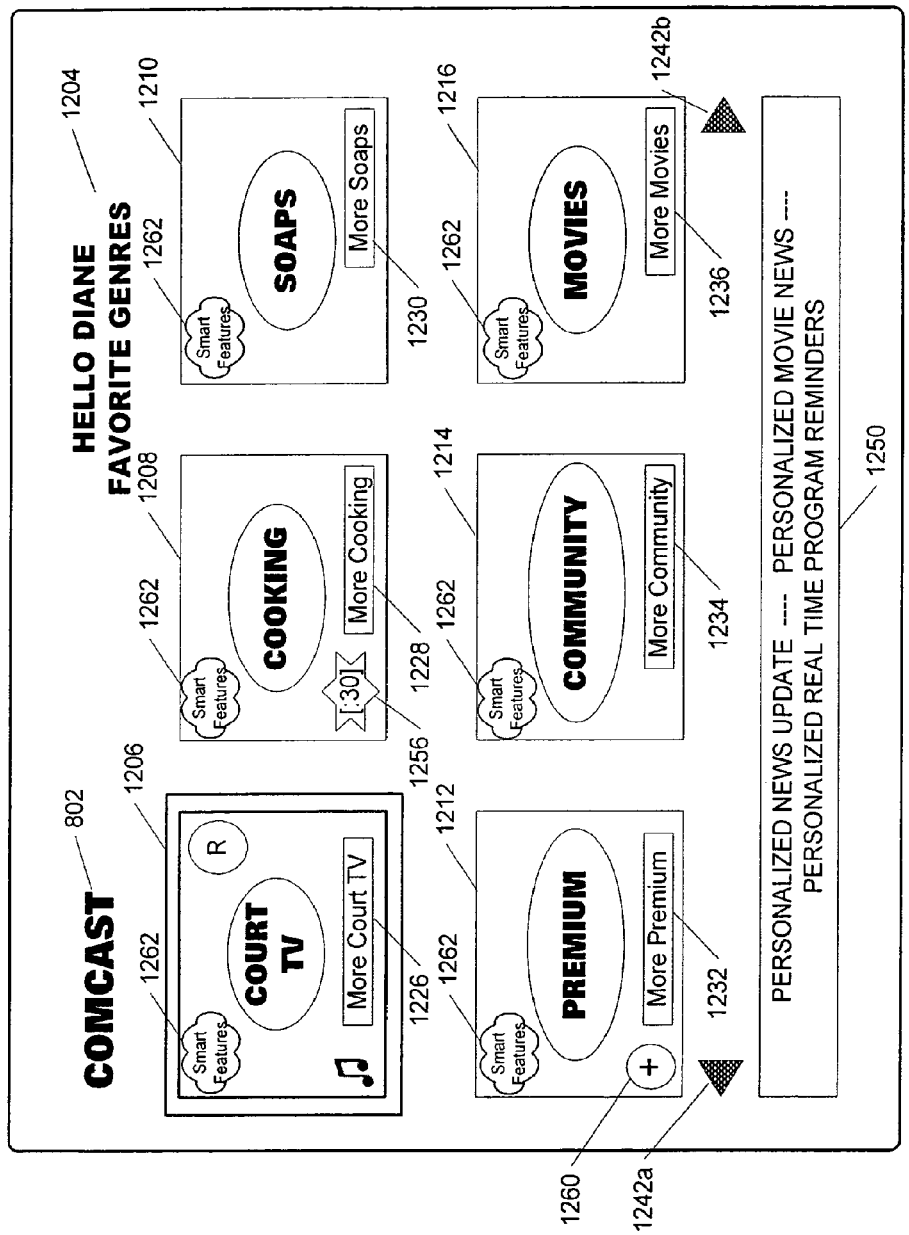
FIG. 12 shows an exemplary menu screen in which a mosaic page for another user is displayed in accordance with the principles of the present invention.

As described above with reference to FIG. 7, separate mosaic pages 708, 710, 712 can be created and displayed for members of a family or a group sharing the user equipment. For example, referring now to FIG. 12, family member "DIANE" may have a mosaic page "Favorite Genres" 1200 with a personal greeting 1204, which in the illustrated exemplary embodiment mirrors DOUG's mosaic page 900. The mosaic pages for different users may have different, identical or overlapping selections, layout and features, with only an illustrative selection of each of the feasible personalized pages being shown in the figures. The smart features 1262 as well as the news bar 1250 may be individually programmed, i.e., personalized for a particular user or user, as described above.

Figure 13:
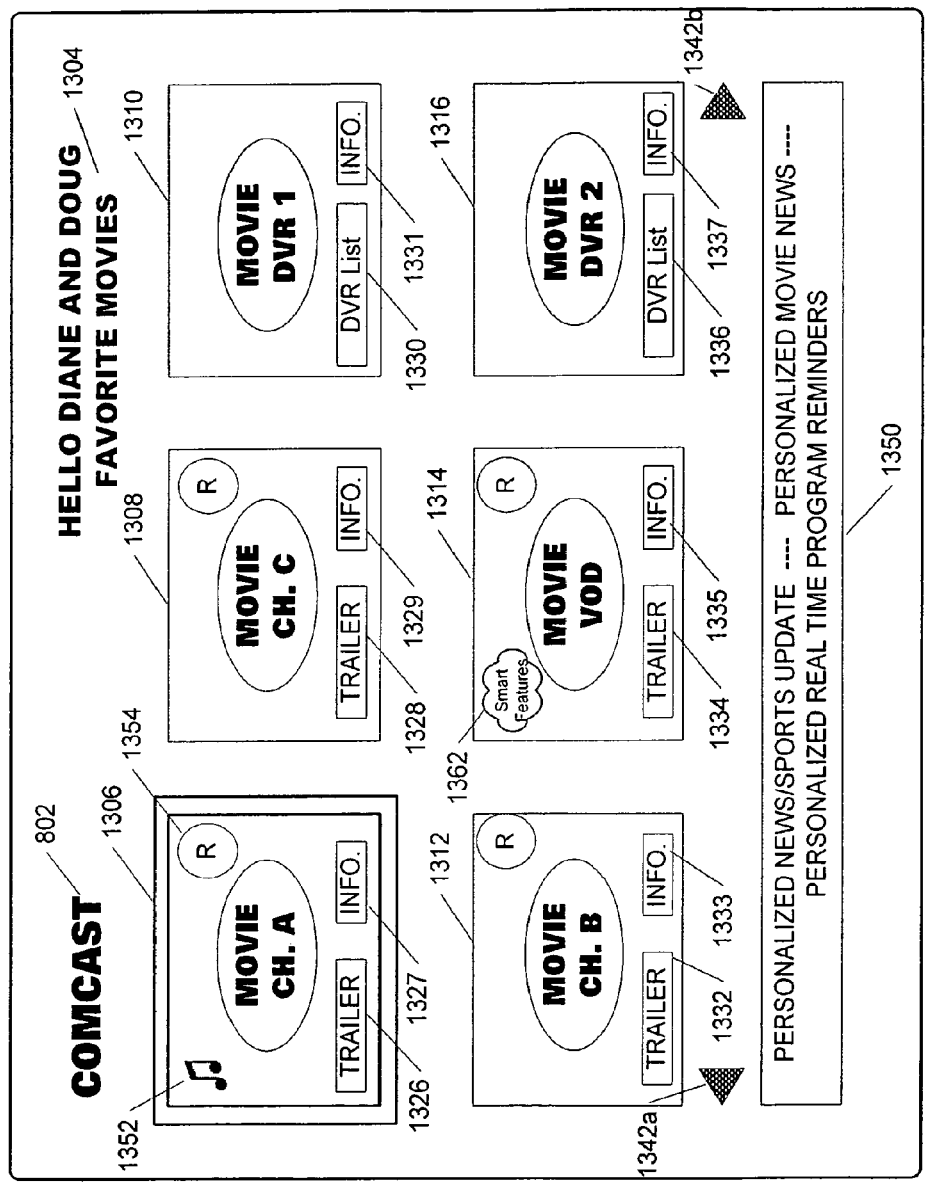
FIG. 13 shows an exemplary menu screen in which a mosaic page for a group of users is displayed in accordance with the principles of the present invention.

FIG. 13 shows an exemplary mosaic page 1300 which is directed to movies and shared between DOUG and DIANE. The illustrative mosaic page 1300 includes three broadcast movie channel cells 1306, 1308, 1312, one VOD channel cell 1314, and two cells for recorded movies 1310, 1316. The cells 1306 through 1316 may include one or more of the previously described personalized features, such as audio selector 1352, RECORD buttons 1354, buttons 1326, 1328, 1332, 1334 for additional options, such as commentary, trailers, availability as VOD, etc. The functionality of buttons 1326, 1328, 1332, 1334 can be identical or similar to that of the ⊕ symbol 860 described above with reference to page 800. If more than the displayed illustrative two movies 1310, 1316 were recorded, then a list may be displayed in lieu of a still image or logo, or a list of movies may be accessible for display by selecting button "DVR List" 1330, 1336 by pressing, for example, the OK button 412 on remote control 400. As mentioned above, any cell can be selected/resized by selecting that cell, and any of the features described above can be accessed in the selected cell. Smart features 1362 can be included and/or programmed on any mosaic page. For example, a sports event may be displayed in a cell personalized for DOUG, but the same smart feature can be associated with another mosaic page, such as page 800 and/or 900.

In approaches such as those described above, a particular cell on a mosaic page may be associated, for example, with a television channel, a television service provider, a video-on-demand (VOD) channel, a pay-per-view (PPV) channel, a recorded video (DVR) program, an interactive media guidance application, a web-site, a program guide service provider, a service, a digital music programmer, and/or a radio station. A cable system operator may reconfigure the providers for these assets by, for example, reassigning or reallocating channels and/or by converting analog channels to one or more digital or HDTV channels. The smart features may be programmed to interrogate the interactive media guidance application and automatically link to user's preferred or most relevant assets to the reallocated channel, making the transition transparent for the user.

As described above, when a cell is highlighted or "in focus," the interactive media guidance application may allow the user to initiate a special function, access interactive content, or both, by pressing keys on remote control 400 to activate features within the cells. The user may have the option to exit at any time, for example to the top level mosaic page 704 (FIG. 7), by pressing the EXIT button 422. Any other suitable option such as a BACK key or a RETURN key may be operable to return to the previous display screen.

The user may view personalized information associated with a cell by, for example, pressing the INFO button 418 on remote control 400. Pressing the INFO button 418 instead of activating, for example, one of the INFO buttons 1327 through 1337 on page 1300 may cause the interactive media guidance application to display information about the entity associated with that cell. The information may be displayed in any suitable format. Links to information, menus, other interactive content, or special functions may also be provided. The information displayed after the INFO button 418 is pressed may be displayed in full screen or in a portion of the display screen. In one suitable approach, the information may be displayed in a portion of a cell, or in an entire cell.

Any suitable approach to provide the user with information, an information screen, a menu screen, or any other suitable display may be used. Any suitable approach to provide the user with suitable options or a way to initiate additional functionality may be used. The preceding examples of the functions associated with specific keys on a remote control are also merely illustrative. The initiation of any function or the display of any display screen or information may be associated with any button on a page and/or with any key on the remote control 400. Any function or the display of any page or information may also be initiated by issuing any other suitable command to the interactive media guidance application, such as a computer command or a voice command when using a system capable of voice recognition.

The interactive media guidance application, in particular the aforedescribed exemplary mosaic home pages and the other mosaic pages, may also display indicators in a cell, or in close proximity to a cell, to notify the user that the user may access interactive content or initiate a special function associated with that cell. These indicators may be displayed when a cell is highlighted or when a cell is not highlighted. For example, an indicator displayed around or in close proximity to a cell may blink or be a pre-determined shape or color to notify the user that the user may access interactive content or initiate a special function associated with that cell. These examples are merely illustrative. Any suitable indicator may be displayed to notify the user that there may be interactive content or additional functionality associated with a cell.

The aforedescribed mosaic pages may include smart features 862, 962, 1062, 1162, 1262. In general, such smart features may be associated with a cell whenever such smart features add functionality to the cells. Returning now to FIG. 8, an exemplary smart feature 862 associatable with cell 810, here shown as the ESPN sports channel, may make reference to an upcoming Duke University basketball game or a golf event featuring the user's favorite player. The smart feature can track viewer habits, for example, the frequency and time when a viewer tunes to' a certain channel.

When a viewer wants to watch a movie featuring, for example, Jack Nicholson or Julia Roberts, or a football game with Duke University, the smart feature will access and process information from the interactive media guidance application. This type of information can be available for viewing on a conventional interactive program guide (IPG), for example, by pressing the INFO button 418 on remote control 400, without being associated with a searching functionality. The disclosed smart features can search "deeper" in the interactive media guidance application or in other content-related information for entries that match user preferences and/or selections.

Figure 14:
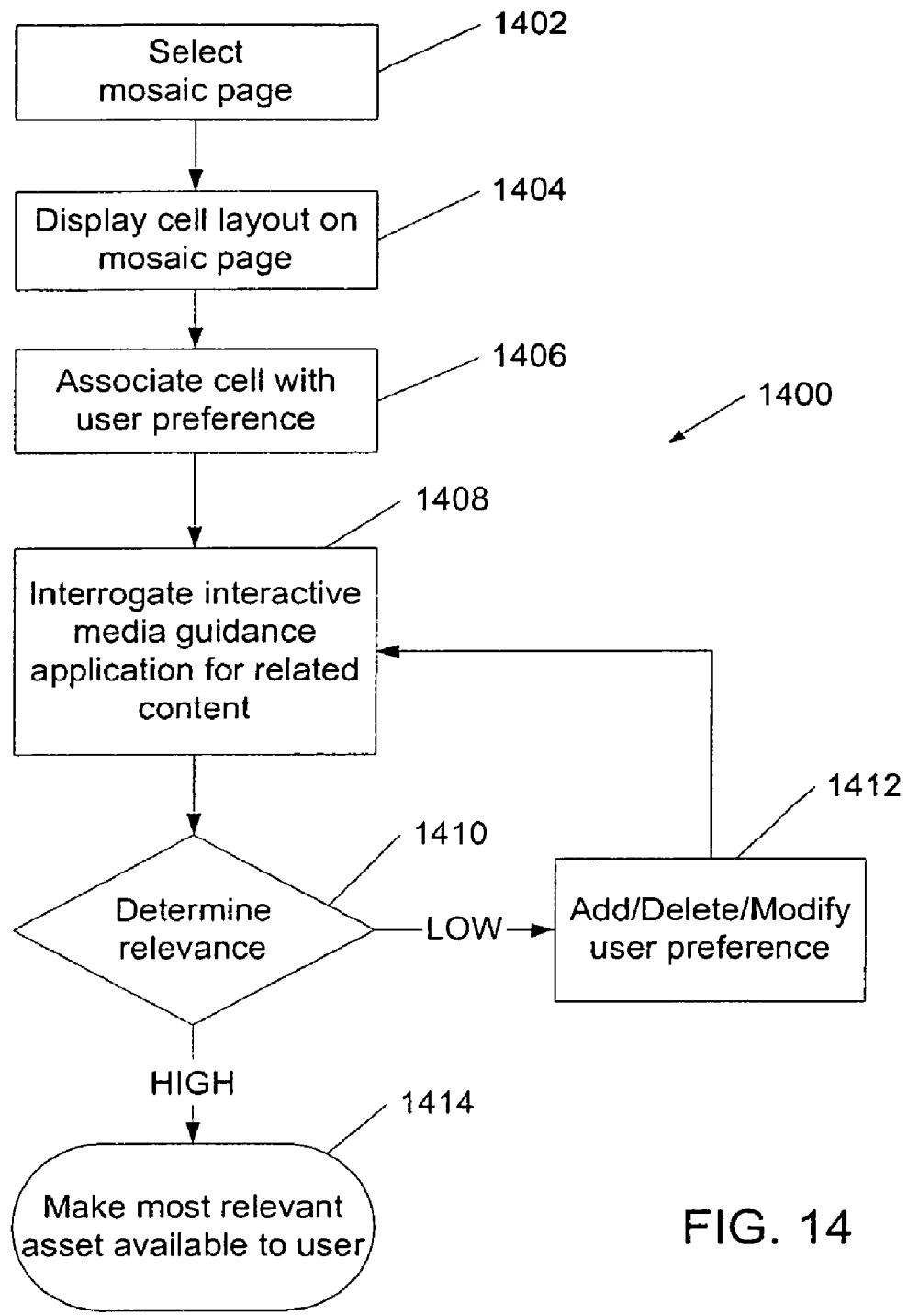
FIG. 14 is a schematic process flow for selecting and modifying a smart feature according to the invention.

FIG. 14 shows an exemplary schematic process flow 1400 for selecting a smart feature in a mosaic cell that has a media source associated with it, for example smart feature 862 in cell 810 of mosaic page 800. At step 1402, illustrative mosaic page 800 is selected and a cell layout which can be based on a template and personalized for a user is displayed, at step 1404. The mosaic pages and cells can be personalized in a manner described above with reference to FIGS. 7 through 13. Media sources, which can be TV broadcasts, VOD programs, radio programs, media streamed over a network, such as the Internet (IPTV), program guides, stored programs, as well as links to subordinate personalized pages can be associated with the cells. Illustrative cell 810 includes smart feature 862, which for the exemplary cell 810 is associated with the ESPN broadcast channel. The cell may be associated with a user preference based, for example, on user input or a historic viewing frequency of a program or otherwise related content directed to sports events, step 1406. The user preference can then be compared with certain identifiers or other information, such as titles, names of performers or actors, venues, etc., in the interactive media guidance application (supplied, for example, by data source 120—FIG. 1), at step 1408. Details of the comparison process will be described below with reference to FIG. 16. If the user preference matches or at least approximately matches the identifier or the other information, as determined by a computed high relevance score, at step 1410, the asset with the greatest relevance is made available or displayed in a cell to the user, at step 1414. If only a poor match is found, as determined by a low relevance score at step 1410, then the user may be prompted to modify or delete the stated preference, or add a preference, at step 1412. The preference may also be left unchanged (not shown in the process flow) to allow process 1400 to check for a match at a later time, for example after a day or a week, since the service provider may from time to time update the assets.

Figure 15:
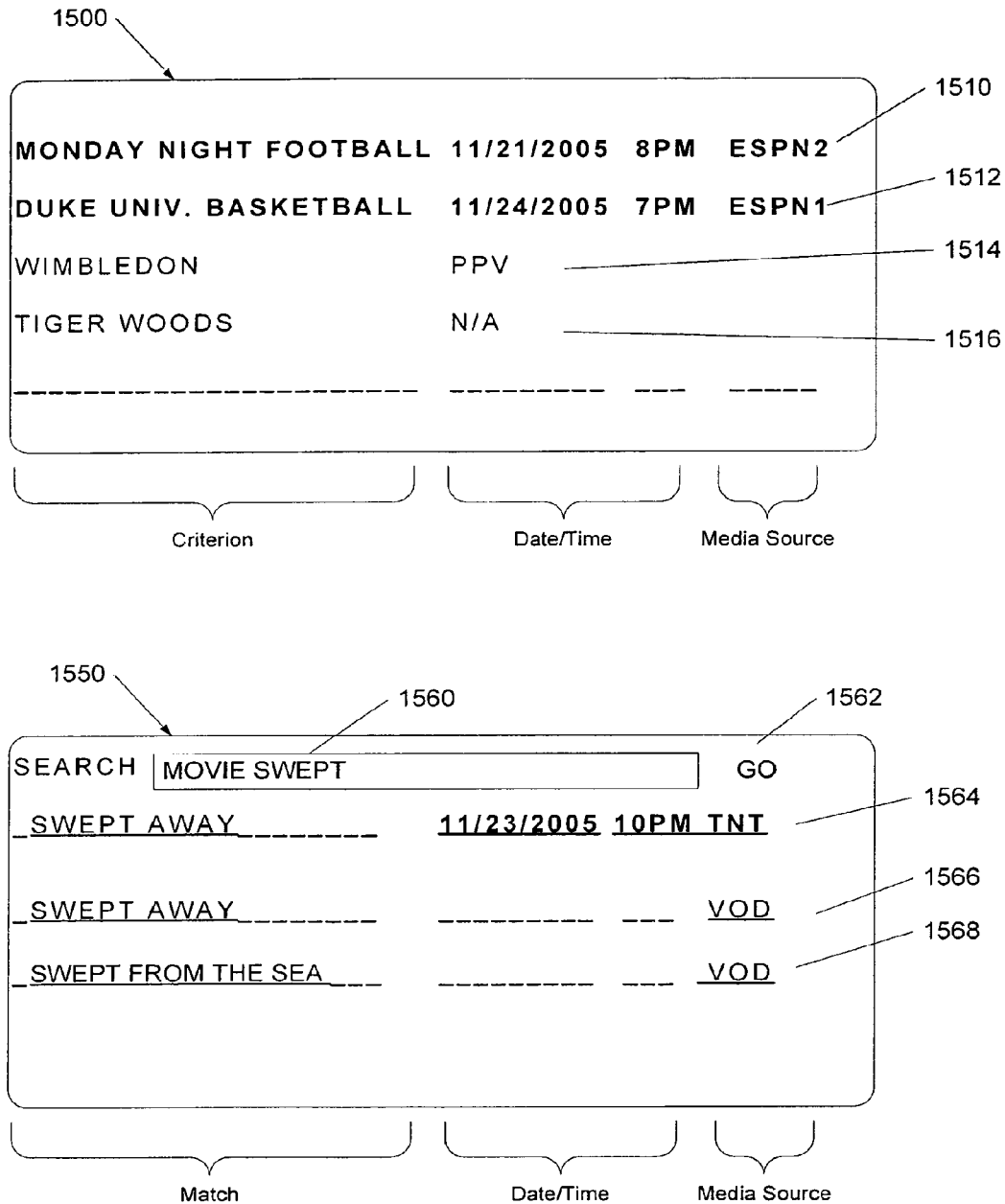
FIG. 15 shows schematically a screen display of an alert window according to the invention.

FIG. 15 schematically shows screen shots 1500 and 1550 of an exemplary user preference, which may be opened in a separate window. A schematic window 1500 associated, for example, with smart feature 862 in cell 810, displays two scheduled sports events from Duke University 1510, 1512, the scheduled date/time of the event, as well as the source or channel of the broadcast. As mentioned above, event 1510 (Monday Night Football) may have been associated with a particular cell or mosaic page based on the viewer habit, e.g., that the viewer almost never misses a Monday Night football game. The viewer may select the entry 1510 to learn more about the teams and the venue of that game. The second entry 1512 may have resulted from a manual user entry, as illustrated for a movie selection in screen shot 1550. Two additional events 1514, 1516 are specified only in the form of a general topic (Wimbledon) or by providing the name of a featured player (Tiger Woods), without further association with a broadcast channel or date. As indicated by the display "PPV", the interactive media guidance application has found a matching entry in a pay-per-view channel, whereas the display "N/A" indicates that the interactive media guidance application did not find an entry under that name. The user may click on the displayed preference in the window of the smart feature to add/delete/modify the content. For example, the user may want to delete the entry "Tiger Woods", since this program is not available, and may instead opt for another golf tournament.

Window 1550 shows an exemplary search window that may be accessed from the smart feature, for example, by pressing a SEARCH button on the remote control 400. Alphanumeric input may be entered using a variety of input devices, such as simulated keyboards displayed on the display screen, or keys 404 on the remote control 400. Remote control 400 may have a QWERTY alphanumeric keyboard. Alternatively, the number keys 1 through 9 and the "*" and "#" on the numerical keypad of the remote control 400 may be used to enter letters; for example, the letters A, B, C may be entered by a repeatedly pressing the "2" key. It is also known to employ predictive text entry which anticipates text entered by a user, for example by employing a learning function. The smart feature can be exited, for example, by pressing the EXIT key on remote control 400.

Figure 16:
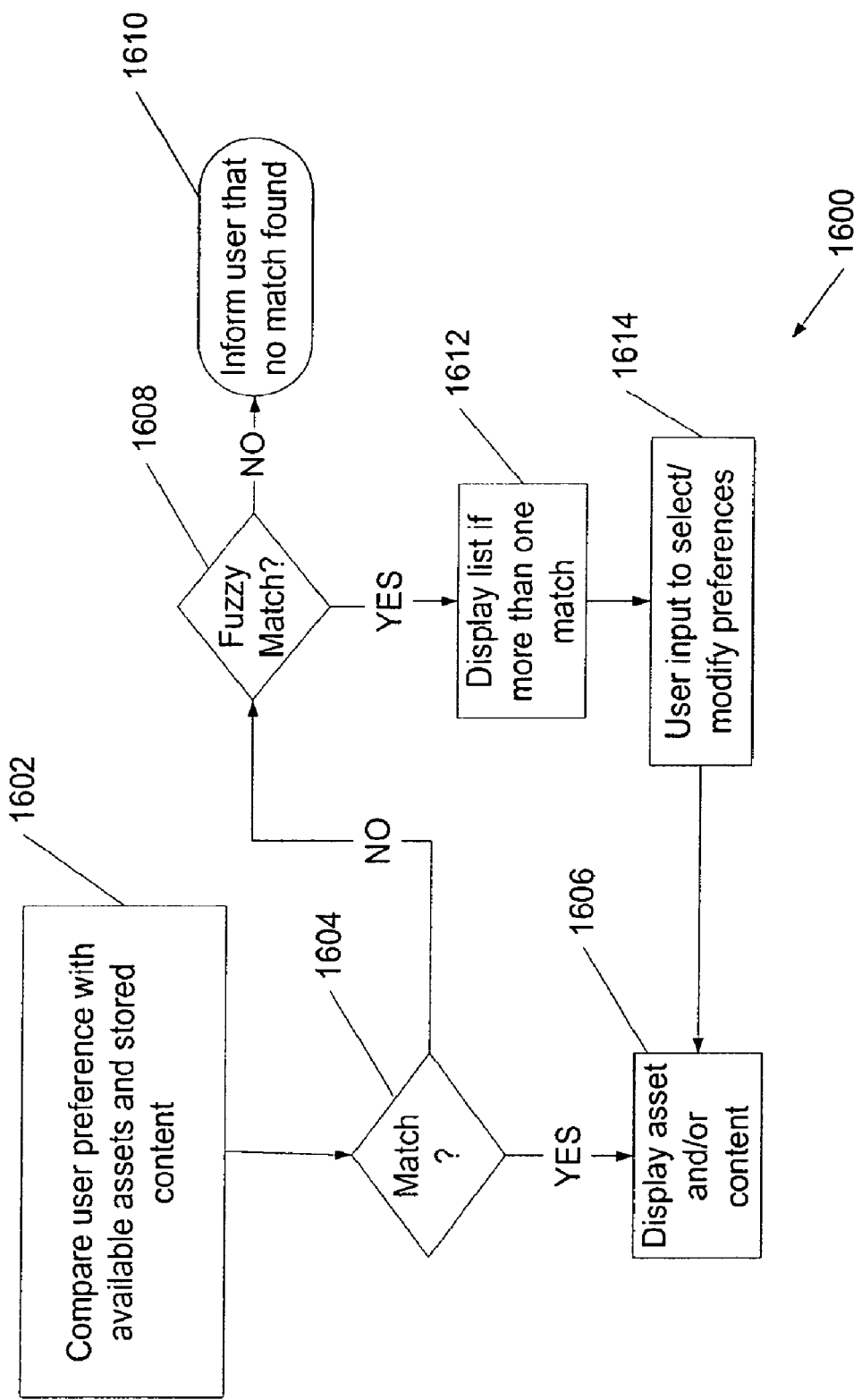
FIG. 16 is a schematic process flow for comparing smart feature content with information from the interactive program guide and other content.

A process flow 1600 for displaying on a mosaic page an asset of high relevance for a user, as determined by the smart features, is shown in FIG. 16. At step 1602, the smart feature compares the user preference with available assets and/or stored content. As mentioned above, the term "user preference" in the context of the present invention refers to, for example, to an explicit or implicit indication that a user has interest in the asset. An explicit indication may include active user input, such as a selection of the asset or a search string describing an asset, whereas an implicit indication may be based on the frequency with which a user views a particular asset or an asset related to a particular asset. If it is determined, at step 1604, that the user preference matches an asset or stored content, then the asset or content is displayed in a cell on the mosaic page, at step 1606. Instead of displaying the asset or content directly, a message about the current or future availability of the asset or content can be displayed, for example in message bar 850 (FIG. 8). The user equipment 108 may be programmed to record the asset, provided that there is no conflict with another scheduled recording.

Conversely, at step 1604, if it is determined that no exact match exists between the user preference and an asset or stored content, then it is checked, at step 1608, if at least a partial (fuzzy) match exists. The degree or fuzziness of a match can be computed using a suitable scoring function, for example, a cost function or relevance score. A suitable threshold value can be preset, whereby the match is considered reliable, if the score of the match exceeds the preset threshold value. At step 1608, if it is determined that no match with a score greater than the preset threshold value exists, then the user may be informed, at step 1610, that the selection criterion does not match any asset or stored content. The user may have the option to delete the entry or to roll the entry to another date, such as the next day or next week, because the asset or content may change over time. Conversely, if the score of the match at step 1608 exceeds the threshold value, possibly with more than one entry providing a match, then a list with options may be displayed to the user, at step 1612. The user can select potentially matching entries from that list, or the user can modify the preference, step 1614. The process 1600 then goes to step 1606 to display the asset in the respective cell, as discussed above.

Figure 17:
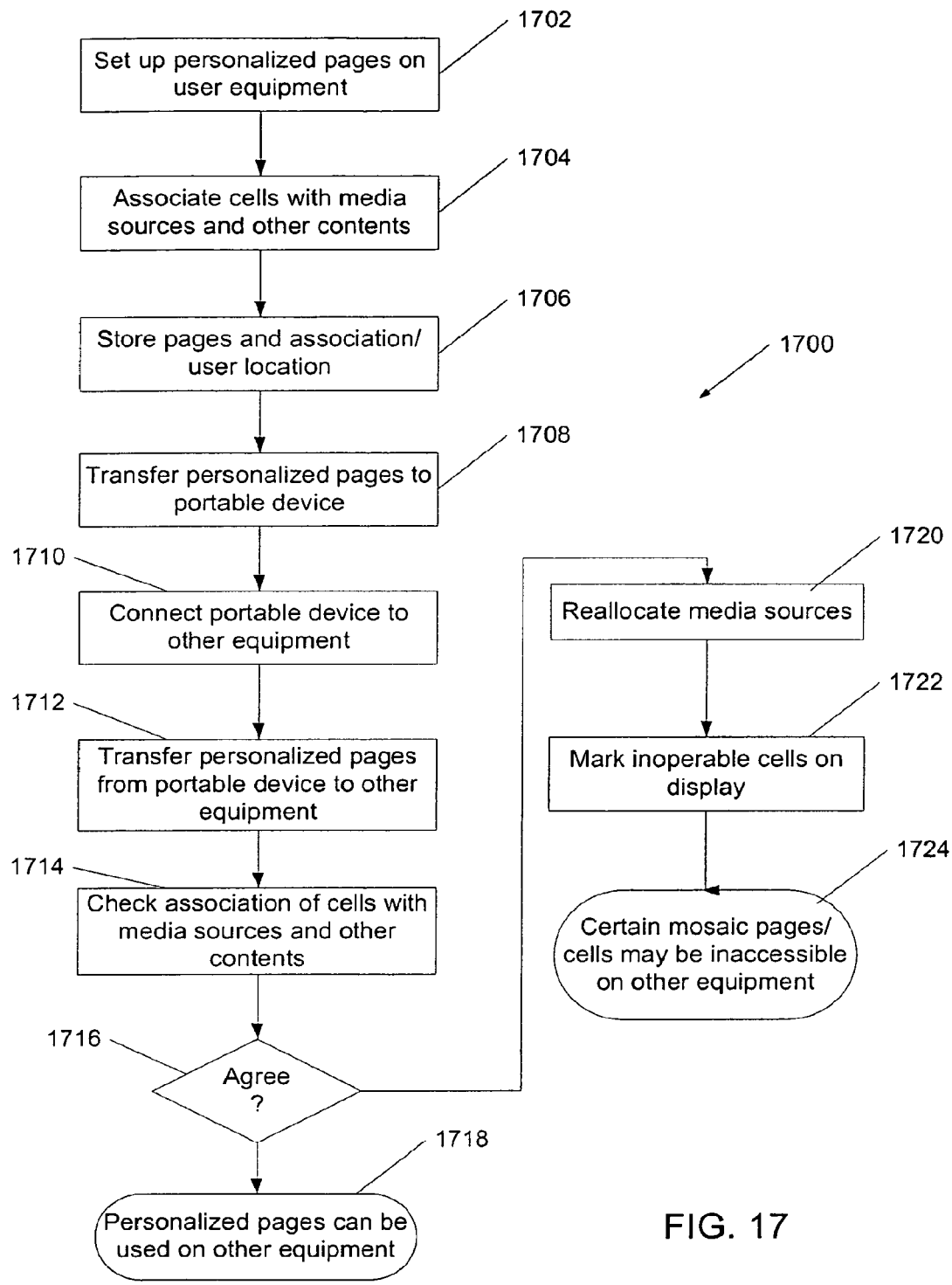
FIG. 17 is a schematic process flow for transferring personalized pages by using a portable medium.

As mentioned before, the mosaic homepage and other mosaic pages may be stored on the user equipment. However, a user may want to have the opportunity to view his/her personal pages on another device and/or at another location, for example at a vacation home or when traveling, without the need to reprogram the pages or cells on the pages. FIG. 17 shows schematically an exemplary process 1700 which allows a user to personalize pages on one set of user equipment and to transport or transfer the mosaic pages, including the smart features, to another set of user equipment at another location.

At step 1702, a user creates mosaic pages with cells having personalized and smart features. As described above, the user-specified content of the selected cells can be associated with a particular channel allocation in the interactive media guidance application or with other content, such as VOD, PPV or stored DVR content, step 1704. The channel allocation for the mosaic pages, which is typically associated with the physical location of the user equipment, such as the ZIP code, can be stored on the user equipment, step 1706. The user may want to transfer the mosaic pages, or information about the mosaic pages, to another device. In one embodiment, the mosaic page can be copied at the user equipment to a portable device, at step 1708. The portable device can be a recordable device, such as a memory stick, a flash card, and/or a recordable CD, or another wired or wireless device connected to or in communication with the user equipment 108. Suitable wired connections, such as USB or FireWire ports, or wireless connections, such as Bluetooth, can be employed.

At step 1710, the portable device can then be connected, either by a wire or wireless, for communication with another piece of user equipment which may be different from the first piece or be located at another physical location. At step 1712, the mosaic pages or information about the mosaic pages are communicated from the portable device to the other user equipment, which then checks the association between the cells on the mosaic pages and the media sources on the other user equipment, step 1714. This is necessary because the service provider or distribution facility may associate the mosaic page with different media sources on the other user equipment. At step 1716, if it is determined that the media sources are unchanged, for example, when the user receives the media content via a home network or another network, then the user can open and use his/her personalized pages on the other user equipment without making any changes, step 1718.

Conversely, if the media sources providing the assets for the mosaic page have changed, then the interactive media guidance application at the other location may attempt to reallocate the media sources, at step 1720, based, for example, on metadata of the cells. The search for the corresponding channels may make use of the smart features by intelligently searching the interactive media guidance application at the other user equipment.

It can be expected that several assets, for example local broadcast channels, video-on-demand (VOD) assets, or locally stored content (DVR) may not always be available at the other location. In this case, inoperable assets/content may be detected by the system and the user may be informed, for example by a message on the message bar, and the corresponding cells may be deleted or otherwise marked on the display, at step 1722. This may leave the user with one or more mosaic pages or cells on a mosaic page, at step 1724, which are inaccessible at the other user equipment.

In an alternative embodiment, which is not illustrated, the mosaic page or respective information about the mosaic page may be stored centrally, for example, at the distribution facility 104 or at any other suitable location in the interactive media guidance system 100 (FIG. 1). The page or information can then be transmitted, optionally in modified form when the allocation of the media sources has changed, as described above, to the other user equipment via any of the communication paths indicated in FIG. 1.

Thus, an interactive television application with smart navigation in an arrangement of cells (a mosaic guide) on a mosaic home page or other personalized pages is provided. One skilled in the art will appreciate that the present invention can be practiced by other than the described embodiments, which are presented for purposes of illustration and not of limitation, and the present invention is limited only by the claims which follow.

What is claimed is:

1. A method for displaying, at a user equipment device, video assets of interest to a user, comprising:
   arranging on a mosaic page a plurality of cells;
   receiving a selection from the user of a first of the plurality of cells;
   receiving an input from the user specifying a criterion for the user selected first;
   for each of a plurality of video assets matching the user specified criterion, determining, in a processor, a score indicative of relevance of the respective video asset to the user by comparing historic or expressed user preferences with data associated with the respective video asset;
   filtering the plurality of video assets to remove video assets having scores below a predetermined threshold value;
   selecting from the filtered plurality of video assets, for display in the user selected first cell, a video asset having the greatest score indicative of relevance to the user; and
   displaying the selected video asset in the user selected first cell on the user equipment device.

2. The method of claim 1, wherein the user preferences include at least one of an asset's genre, a broadcast channel supplying the asset, and a media source supplying the asset.

3. The method of claim 1, wherein the relevance to the user is associated with the user's viewing frequency of the asset.

4. The method of claim 1, wherein the user preferences are entered in form of alphanumeric characters using a remote input device or a keyboard.

5. The method of claim 1, further comprising displaying on the mosaic page information associated with the displayed video asset.

6. The method of claim 1, wherein the user preferences are entered by the user manually or selected from a displayed list.

7. The method of claim 1, wherein determining the score indicative of relevance to the user further comprises comparing the user preferences with at least one of a title, a name of a performer, a show time, a media channel, and a synopsis of the identified content supplied by the interactive media guidance application.

8. The method of claim 1, wherein the selected video asset is selected from a television channel, a television service provider, a video-on-demand (VOD) channel, a pay-per-view (PPV) channel, a recorded video (DVR) program, an interactive media guidance application, a web-site, a program guide service provider, a service, a digital music programmer, a radio station, and any combination thereof.

9. The method of claim 1, wherein the selected video asset is displayed as a full-motion video.

10. The method of claim 1, wherein the mosaic page is personalized for a user.

11. The method of claim 1, wherein a layout of the plurality of cells on the mosaic page is selected from at least one template.

12. The method of claim 3, wherein comparing includes performing a fuzzy match between the user preference and the data.

13. The method of claim 1, further comprising associating the user selected first cell of the mosaic page with interactive features.

14. The method of claim 13, wherein the interactive features are accessed via a remote control device.

15. The method of claim 14, wherein the interactive features are selected from the group consisting of a shopping opportunity, a program promotion, a selection of additional program content, a recording button, and availability of interactive program snipes.

16. The method of claim 1, further comprising providing a plurality of mosaic pages, said plurality of mosaic pages arranged hierarchically, with each mosaic page containing at least one cell having the greatest score indicative of relevance to the user.

17. The method of claim 1, further comprising making information about the mosaic page on a first user device available on a second different user device.

18. The method of claim 17, wherein making the information available comprises storing the information on a portable medium, storing the information at a central location accessible to the first and second user device, or transmitting the information from the first to the second user device via a network connection, or a combination thereof.

19. The method of claim 18, wherein the portable medium is selected from the group consisting of an infrared remote control, a personal digital assistant (PDA), a cell phone, a memory stick, a memory card, a recordable CD and a recordable DVD.

20. A system for displaying, at a user equipment device, video assets of interest to a user, comprising:
a display displaying a mosaic page having a plurality of cells; and
user equipment configured to:
receive a selection from the user of a first of the plurality of cells;
receive an input from the user specifying a criterion for the user selected first cell;
for each of a plurality of video assets matching the user specified criterion, determine a score indicative of relevance of the respective video asset to the user by comparing historic or expressed user preferences with data associated with the respective video asset;
filter the plurality of video assets to remove video assets having scores below a predetermined threshold value;
select from the filtered plurality of video assets, for display in the user selected first cell, a video asset having the greatest score indicative of relevance to the user; and
display the selected video asset in the user selected first cell on the display.

21. The system of claim 20, wherein the user preference include at least one of an asset's genre, a broadcast channel supplying the asset, and a media source supplying the asset.

22. The system of claim 20, wherein the relevance to the user is associated with the user's viewing frequency of the asset.

23. The system of claim 20, wherein the user preferences are entered in form of alphanumeric characters using a remote input device or a keyboard.

24. The system of claim 20, wherein the display further displays on the mosaic page information associated with the displayed video asset.

25. The system of claim 20, wherein the user preferences are entered by the user manually or selected from a displayed list.

26. The system of claim 20, wherein the score indicative of relevance to the user is determined by comparing the user preferences with at least one of a title, a name of a performer, a show time, a media channel, and a synopsis of the identified content supplied by the interactive media guidance application.

27. The system of claim 20, wherein the selected video asset is selected from a television channel, a television service provider, a video-on-demand (VOD) channel, a pay-per-view (PPV) channel, a recorded video (DVR) program, an interactive media guidance application, a web-site, a program guide service provider, a service, a digital music programmer, a radio station, and any combination thereof.

28. The system of claim 20, wherein the selected video asset is displayed as a full-motion video.

29. The system of claim 20, wherein the mosaic page is personalized for a user.

30. The system of claim 20, wherein a layout of the plurality of cells on the mosaic page is selected from at least one template.

31. The system of claim 22, wherein the user equipment is configured to perform a fuzzy match between the user preference and the data.

32. The system of claim 20, wherein the user equipment is configured to associate the user selected first cell of the mosaic page with interactive features.

33. The system of claim 32, wherein the interactive features are accessed via a remote control device.

34. The system of claim 32, wherein the interactive features are selected from the group consisting of a shopping opportunity, a program promotion, a selection of additional program content, a recording button, and availability of interactive program snipes.

35. The system of claim 20, wherein the user equipment is configured to configure a plurality of mosaic pages, said plurality of mosaic pages arranged hierarchically, with each mosaic page containing at least one cell having the greatest score indicative of relevance to the user.

36. The system of claim 20, wherein the user equipment is configured to make information about the mosaic page on a first user device available on a second different user device.

37. The system of claim 36, wherein the information is made available by storing the information on a portable medium, storing the information at a central location accessible to the first and second user device, or transmitting the information from the first to the second user device via a network connection, or a combination thereof.

38. The system of claim 37, wherein the portable medium is selected from the group consisting of an infrared remote control, a personal digital assistant (PDA), a cell phone, a memory stick, a memory card, a recordable CD and a recordable DVD.

39. The method of claim 1, further comprising selecting, in response to determining that the filtered plurality of video assets is empty, supplementary information for display in the first cell.

40. The method of claim 39, wherein the supplementary information includes a message about the current or future availability of an additional plurality of video assets.

41. The method of claim 39, wherein the supplementary information includes an option to modify the expressed user preferences.

42. The system of claim 20, wherein the user equipment is further configured to select, in response to determining that the filtered plurality of video assets is empty, supplementary information for display in the first cell.

43. The system of claim 42, wherein the supplementary information includes a message about the current or future availability of an additional plurality of video assets.

44. The system of claim 42, wherein the supplementary information includes an option to modify the expressed user preferences.

* * * * *

UNITED STATES PATENT AND TRADEMARK OFFICE
CERTIFICATE OF CORRECTION

PATENT NO. : 8,316,394 B2  
APPLICATION NO. : 12/634869  
DATED : November 20, 2012  
INVENTOR(S) : Doug Yates Page 1 of 1

It is certified that error appears in the above-identified patent and that said Letters Patent is hereby corrected as shown below:

Claim 1, column 28, line 35, change "first;" to --first cell;--.

Claim 15, column 29, line 24, change "14" to --13--.

Claim 21, column 30, line 3, change "preference" to --preferences--.

Signed and Sealed this  
Fifth Day of February, 2013

Teresa Stanek Rea  
*Acting Director of the United States Patent and Trademark Office*